United States Patent
Odoi et al.

(10) Patent No.: US 6,620,365 B1
(45) Date of Patent: Sep. 16, 2003

(54) METHOD OF MANUFACTURING A CONVERTIBLE TOP ASSEMBLY

(75) Inventors: Kozo Odoi, Aki-Gun (JP); Tatsuya Tamura, Yokohama (JP); Akira Akatsu, Yokohama (JP); Shoji Sekimoto, Yokohama (JP); Hirotoshi Mimura, Yokohama (JP); Tsutomu Yoshinari, Yokohama (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/076,534

(22) Filed: May 12, 1998

(30) Foreign Application Priority Data

May 12, 1997 (JP) .............................................. 9-120844
Aug. 22, 1997 (JP) .............................................. 9-226664

(51) Int. Cl.⁷ ............................................. B29C 45/14
(52) U.S. Cl. ....................... 264/261; 264/263; 264/273; 264/274; 264/275
(58) Field of Search ....................... 296/107.07, 146.14, 296/145; 160/179, 237; 219/203; 439/34; 156/245; 214/257, 261, 263, 273, 274, 275

(56) References Cited

U.S. PATENT DOCUMENTS

| | | | | | |
|---|---|---|---|---|---|
| 2,383,196 | A | * | 8/1945 | Slicer ...................... | 296/208 X |
| 3,091,494 | A | * | 5/1963 | Cohen ..................... | 296/107.07 |
| 3,388,945 | A | * | 6/1968 | Kevelin et al. ............ | 296/145 |
| 4,455,481 | A | * | 6/1984 | Van Hoof et al. ........ | 219/203 X |
| 4,626,021 | A | * | 12/1986 | Muscat ............... | 296/107.07 X |
| 4,728,781 | A | * | 3/1988 | Donley et al. ........... | 219/203 X |
| 4,878,850 | A | * | 11/1989 | Letemps et al. ......... | 219/203 X |
| 4,883,940 | A | * | 11/1989 | Tokarz ....................... | 219/203 |
| 4,997,396 | A | * | 3/1991 | Gold et al. .............. | 219/203 X |
| 5,023,403 | A | * | 6/1991 | Eckardt et al. ......... | 219/203 X |
| 5,040,844 | A | * | 8/1991 | Stolz et al. ............. | 296/107.07 |
| 5,050,663 | A | * | 9/1991 | Rhoads et al. ........ | 296/107.07 X |
| 5,271,655 | A | * | 12/1993 | Ball et al. ............... | 296/146.14 |
| 5,454,615 | A | * | 10/1995 | Schnepf ............... | 296/146.14 X |
| 5,464,265 | A | | 11/1995 | Hemmis ................ | 296/146.14 |
| 5,558,390 | A | * | 9/1996 | Hemmis et al. ....... | 296/146.14 |
| 5,560,671 | A | * | 10/1996 | Ojanen et al. ......... | 296/146.14 |
| 5,600,922 | A | * | 2/1997 | Stolz ................. | 296/146.14 X |
| 5,624,591 | A | * | 4/1997 | Di Trapani ............. | 219/203 X |
| 6,270,146 | B1 | * | 8/2001 | Hirmer et al. ......... | 296/146.14 |

FOREIGN PATENT DOCUMENTS

| | | | | |
|---|---|---|---|---|
| DE | 3835292 | A1 | 4/1990 | .............. B60J/7/08 |
| DE | 3841035 | A1 | 6/1990 | .............. B60J/7/12 |
| DE | 4240281 | * | 4/1994 | .............. 296/146.14 |
| DE | 19518658 | A1 | 11/1996 | |
| EP | 0 284 931 | A | 10/1988 | |
| EP | 0 480 352 | A | 4/1992 | |
| JP | 3-26010 | | 5/1991 | .............. B60J/7/12 |
| JP | 4-20824 | | 2/1992 | .............. B60J/1/14 |
| JP | 4-23052 | | 5/1992 | .............. B60J/7/12 |
| JP | 4-288207 | | 10/1992 | .......... B29C/39/10 |

OTHER PUBLICATIONS

European Search Report for Application No. EP 98108628.3 dated Sep. 9,1998.

* cited by examiner

*Primary Examiner*—Edmund H. Lee
(74) *Attorney, Agent, or Firm*—Sidley Austin Brown & Wood LLP

(57) ABSTRACT

A manufacturing method for a foldable convertible top assembly in which a window plate is connected to a sheet material by a resin connecting element. The frame member has a predetermined transverse cross-sectional shape formed by hardening a liquid-form synthetic resin at the outer peripheral edge of the window plate. The outer peripheral edge of the window plate is attached to the resin connecting element and the foldable sheet material is also attached to the connecting element.

24 Claims, 25 Drawing Sheets

FIG_16

FIG_18

METHOD OF MANUFACTURING A CONVERTIBLE TOP ASSEMBLY

BACKGROUND OF THE INVENTION

The present invention relates to a convertible top assembly for a convertible automobile, which is installed at the upper rear of an automobile, and a manufacturing method and apparatus for the same.

A convertible automobile is defined as an automobile provided with a detachable hard top or a foldable top roof above the automobile in place of a fixed roof. A convertible top assembly is provided with a transparent window plate in a foldable sheet, which is a top. When in use, it forms a top roof above the vehicle body to cover the front and/or rear seat with a roof, and when not in use, the sheet is folded to the rear to open the roof.

The prior art relating to such a convertible top assembly have been disclosed in, for example, U.S. Pat. No. 4,799,727, U.S. Pat. No. 5,061,332, U.S. Pat. No. 5,464,265, and Japanese Utility Model Publication No. 3-26010.

In U.S. Pat. No. 4,799,727, when a convertible top is stored in the vehicle body, two window plates are connected by a resin-made flexible hinge and capable of being folded so that the window plate provided in the sheet is not a hindrance to folding the top. However, in this prior art patent, a connecting element that connects the two window plates and the outer peripheral end portion of window plate is inserted into a portion of a U-shaped cross section and fixed, so that it cannot be used for a window plate or sheet of various thicknesses.

Next, in U.S. Pat. No. 5,464,265, and related U.S. Pat. No. 5,558,390 a window plate and a sheet are connected to each other and integrated. The convertible top assembly comprises a window plate provided with first fixing means, a sheet provided with second fixing means, and a connecting element of a synthetic resin extrusion molded into a long material, having a predetermined cross sectional shape, and the connecting element and the sheet are fixed to each other by high frequency welding. However, in this prior art patent, the work involved in connecting the connecting element to the window plate or sheet is troublesome, and also the bonding force between the connecting element and the sheet is weak because the end portion of the connecting element and the end portion of the sheet are high frequency welded partially with these end portions being lapped.

Also, high frequency welding is performed by holding the connecting element and the sheet between a pair of electrodes and by applying pressure, so that a trace of electrode remains on the surface of the sheet or the connecting element and the appearance is sometimes impaired. When the connecting element is of a flat plate shape, there is scarcely a technical problem. However, when the connecting element has a deformed shape cross section of thick wall, it is difficult to fix with a sufficient strength. Further, the manufacturing method requires relatively many steps.

In U.S. Pat. No. 5,061,332, when a window plate is replaced, a window plate and a sheet are connected to each other and integrated. A connection frame having a thermal resistance wire is provided, and by heating the thermal resistance wire provided in the connection frame, a sheet and the connection frame are bonded by softening a hot metal adhesive between them. However, this prior art has the same problem as in the case of U.S. Pat. No. 5,464,265.

Japanese Utility Model Publication No. 3-26010 discloses a convertible top of a similar construction. In this prior art, a window plate and a sheet are joined via a seal material to enhance the sealing property.

The present invention was made in view of the above situation, and accordingly an object thereof is to provide a convertible top assembly in which a window plate or a sheet is fixed via a connecting element with a sufficient fixing strength and the connecting strength is not affected by the cross-sectional shape of the connecting element, and a manufacturing method and apparatus capable of manufacturing the assembly easily.

SUMMARY OF THE INVENTION

To achieve the above object, the present invention, as set forth in the appended claims and not limited by this description, provides a convertible top assembly that comprises a window plate made of a transparent material that has top and back surfaces and a predetermined outer peripheral edge shape. The top includes a foldable sheet material having an opening edge of substantially the same or similar shape to the outer peripheral edge shape of the window plate and made of a material softer than the window plate. A connecting element made of a synthetic resin is formed in an elongated form along the outer peripheral edge of the window plate with a transverse deformed shape between the vicinity of outer peripheral edge of the window plate and the vicinity of the opening edge of the sheet material to integrate the window plate and the sheet material.

The top also includes first fixing means for fixing the vicinity of outer peripheral edge of the window plate and the connecting element to each other, as well as second fixing means for fixing the vicinity of the opening edge of the sheet material and the connecting element to each other. The connecting element is formed of a synthetic resin which is placed in a cavity of a die in a compressed state and then solidified, and is fixed to the vicinity of outer peripheral edge of the window plate in the cavity by the first fixing means.

In this application, the term "solidification" includes not only solidification caused by cooling of thermoplastic synthetic resin but also may include solidification (hardening) caused by chemical reaction in the so-called reaction injection molding (RIM) method and solidification (hardening) of sol-form liquid resin by energy such as heat.

In this application, in one embodiment, the connecting element is formed by a synthetic resin which fills the cavity of the die in a compressed state and then solidified and is fixed to the vicinity of outer peripheral edge of the window plate by the first fixing means. Therefore, the strength of the bond or fixing force between the window plate and the connecting element can be increased, and the sealing property or seal created between the window plate and the connecting element is improved. Moreover, since the connecting element is placed or filled into the cavity in a compressed state, even if the connecting element has a asymmetric cross section of a complicated shape, it can be securely attached or fixed to the window plate with sufficient strength. In addition, since the connecting element is a solidified synthetic resin, the forming range of the first fixing means can be selected considering the pulling force that will be applied to the connecting element and the strength of the bond necessary to resist that force.

In one of its presently preferred embodiments, the connecting element is fixed integrally with, or in the vicinity of, an opening edge of the sheet material in the cavity by the second fixing means. The vicinity of the opening edge of the sheet material may be fixed integrally with the connecting element by the second fixing means in a series of laminations over the contact portion. Alternatively, the vicinity of opening edge of the sheet material may be buried in the connecting element and integrated.

In another embodiment, the connecting element is fixed to the vicinity of opening edge of the sheet material outside the cavity by the second fixing means, and the fixing is accomplished over the contact portion with the connecting element. In this manner, the effect of fixing the sheet material to the connecting element is superior than that of the prior art in which the sheet material is fixed to the surface of the connecting element at a part of contact portion with the connecting element. Also, this configuration is effective when the sheet material is difficult to form integrally with a synthetic resin.

The window plate is preferably made of a transparent material and has top and back surfaces and a predetermined outer peripheral edge shape. The top includes a foldable sheet material that has an opening edge of substantially the same or similar shape to the outer peripheral edge shape of the window plate and is made of a material softer than the window plate. A connecting element made of a synthetic resin is formed in an elongated form along the outer peripheral edge of the window plate with a transverse deformed shape between the vicinity of outer peripheral edge of the window plate and the vicinity of opening edge of the sheet material to integrate the window plate and the sheet material.

A first fixing means secures or fixedly attaches the vicinity of the outer peripheral edge of the window plate and the connecting element to each other. A second fixing means secures or fixedly attaches the vicinity of opening edge of the sheet material and the connecting element to each other. The connecting element is formed by a synthetic resin which is placed in a cavity of a die for forming the connecting element in a compressed state and then solidified. The connecting element is fixed to the vicinity of outer peripheral edge of the window plate in the cavity by the first fixing means and also to the vicinity of outer peripheral edge of the window plate outside the cavity by the first fixing means.

In this embodiment, the connecting element is fixed to the vicinity of outer peripheral edge of the window plate outside the cavity by the first fixing means. This configuration is effective when the window plate is difficult to form integrally with a synthetic resin.

The vicinity of opening edge of the sheet material may be enfolded in a gap formed between the connecting element and the vicinity of outer peripheral edge of the window plate. Accordingly, the opening edge of the sheet material does not separate from the connecting element.

The connecting element may be covered by the sheet material so as to be visible from the vehicle outside but not visible from the vehicle inside, which is desirable for special styles of automobiles. Alternatively, the connecting element may be covered by the sheet material so as to be invisible from the vehicle outside, which avoids exposure to the vehicle outside. Therefore, a material with a poor weather resistance such as polyurethane resin can be used as a material for the connecting element.

In another embodiment, formation may be accomplished by having a portion of the connecting element flow into a hole formed in the vicinity of opening edge of the sheet material. A third fixing means is provided for supplementarily fixing the sheet material and the connecting element to each other. Thus, the fixing portion between the sheet material and the connecting element can be reinforced by the connecting element, so that the fixing between the sheet material and the connecting element is made more stable or secure. Additionally, a fourth fixing means may be provided for supplementarily fixing the window plate and the connecting element to each other, which makes the connection more secure. A fifth fixing means may also be provided for fixing between the first fixing means and the second fixing means. In this case, the window plate and the sheet material can be fixed to each other, so that the thickness of the connecting element is decreased, and the lightweight of convertible top assembly can be achieved.

The window plate may also include a heating antidim means on the surface on the vehicle inside of the window plate, and the connecting element fixes a base of a connecting terminal electrically connecting with the heating antidim means to the surface on the vehicle inside of the window plate by covering the base of the terminal. Thus, the connecting terminal can be installed to the window plate in a stable state.

The window plate may also be formed with an opaque colored layer in a predetermined width along the outer peripheral edge of the window plate, and the connecting element may be formed at a position inside the range in which the opaque colored layer is formed. Therefore, the opening edge of the sheet material or the inner peripheral edge of the connecting element can be made difficult to see through the transparent window plate.

The connecting element may be made of a thermoplastic synthetic resin, which material is readily available and inexpensive. As an example of the thermoplastic synthetic resin, for example, scratch resistant PVC (polyvinyl chloride) is preferable. The connecting element may also be made of a synthetic resin formed by the reaction of at least two-component resin raw materials. The desired properties of the resin, which must meet the performance required by the convertible top assembly or the connecting element, can be achieved by regulating the mixing ratio of the resin raw material.

The sheet material may be made of a resin that is mutually soluble with the synthetic resin for the connecting element at least on the side of the connecting element. The second fixing means may be a weld placed between the face of the connecting element and the resin sheet material, which avoids the need for a special material.

The sheet material may be formed by laminating a strength supporting sheet material that provides sufficient tensile strength during use with the resin sheet material mutually soluble with the synthetic resin for the connecting element formed on the side of the connecting element of the strength supporting sheet material. Since the sheet material is formed by laminating the resin sheet material and the strength supporting sheet material, a sheet material having both strength and sealing properties can be used as the sheet material constituting a top.

A fixing agent may be placed at the opening edge portion of the sheet material to prevent separation between the strength supporting sheet material and the resin sheet material, and also prevents, at the same time, the fraying of thread, which easily occurs at the opening edge of the sheet material.

In various embodiments of the invention, the second fixing means may be an adhesive applied to the surface of the sheet material at a portion in contact with the face of the connecting element. The window plate may also be made of inorganic glass alone or in combination with synthetic resin. Inorganic glass improves the scratch resistance, weather resistance, and durability of window surface. Also, the use of synthetic resin reduces the overall weight. In any of these embodiments, the connecting element and the sheet material may have the same or similar color. The use of similar colors covers leaks or other stains from the liquid-form synthetic resin or liquid-form resin raw material on the sheet. Similarly, similar colors cover the presence of burrs on the connecting element and avoid the need for surface treatment.

In yet another embodiment, the present invention provides a method for manufacturing a convertible top assembly, in which the convertible top assembly comprises a window plate made of a transparent material with top and back surfaces and a predetermined outer peripheral edge shape. The top also includes a foldable sheet material that has an outer peripheral edge shape larger than the outer peripheral edge shape of the window plate and made of a material softer than the window plate. A connecting element made of a synthetic resin is formed in an elongated form along the outer peripheral edge of the window plate with a transverse deformed shape between the vicinity of outer peripheral edge of the window plate and the vicinity of opening edge of the sheet material to integrate the window plate and the sheet material.

A first fixing means fixes or attaches the vicinity of outer peripheral edge of the window plate and the connecting element to each other. A second fixing means fixes or attaches the vicinity of opening edge of the sheet material and the connecting element to each other. The window plate is disposed at a predetermined position between mold halves of a die having a pair of mold halves which can be separated at a division face. A cavity of a predetermined shape extending in the lengthwise direction along the outer peripheral edge of the window plate is formed in the vicinity of the outer peripheral edge of the window plate by mold clamping of the die. A part of the cavity is formed by the window plate. The cavity is filled with a liquid-form synthetic resin or a liquid-form resin raw material that forms a synthetic resin by reaction. The interior of the cavity is kept in a heated and compressed state so that the connecting element is formed into a shape corresponding to the shape of the cavity by the subsequent solidification. The connecting element is fixed integrally to the vicinity of outer peripheral edge of the window plate by the first fixing means, and the sheet material is fixed integrally to the connecting element by the second fixing means.

According to the method in accordance with the present invention, a liquid-form synthetic resin, or a liquid-form resin raw material that form a synthetic resin by reaction, is placed in the cavity formed when mold clamping is effected in the die and solidified.

Thus, simultaneously with the formation of the connecting element, the attachment or fixing of the connecting element and the window plate is completed by the first fixing means.

The sheet material may be disposed at a predetermined position between the mold halves and fixed integrally to the connecting element in the cavity by the second fixing means, which permits easier manufacture. Also, the attachment of the window plate and the connecting element by the first fixing means and the attachment of the sheet material and the connecting element by the second fixing means may be completed in the same step. The sheet material disposed at a predetermined position between the mold halves may be brought into close contact with the mold face of one of the mold halves so as to form a part of the cavity.

The window plate may be held, via the sheet material, by holding portions adjacent to the inner peripheral edge of the cavity of the die, and the sheet material may be held by holding portions adjacent to the outer peripheral edge of the cavity. In this manner, the buffering operation and sealing operation are obtained by somewhat compressing the sheet material. This procedure prevents the window plate from being broken or scratched, and avoids excessive occurrence of burrs, during the formation of the connecting element.

A liquid-form synthetic resin or a liquid-form resin raw material that forms a synthetic resin may be injected and fill the cavity from at least one injection gate provided only in the mold half on the side on which the sheet material is not in close contact. Accordingly, the sheet material can easily be brought into close contact with the mold face of the mold half by the injected liquid-form synthetic resin or liquid-form resin raw material that forms a synthetic resin by reaction.

The sheet material disposed at a predetermined position between the mold halves is separated from both mold faces so that the cavity formed by the mold faces of the mold halves and the window plate is divided along the extending direction of the window plate. A hole may be formed in the vicinity of opening edge of the sheet material and a part of the connecting element may then be formed in the hole, as well as a third fixing means for fixing the connecting element and the sheet material to each other by the part may be formed.

According to this manufacturing method, a hole is formed in the vicinity of the outer peripheral edge of the window plate, a part of the connecting element is formed in the hole, and fourth fixing means for fixing the connecting element and the window plate to each other by the part is formed. A fifth fixing means may be formed between the first fixing means and the second fixing means so that fixing is effected between these fixing means.

A liquid-form synthetic resin or a liquid-form resin raw material that forms a synthetic resin by reaction is injected into the cavity from at least one injection gate provided in each of the paired mold halves. Thereupon, according to the method in accordance with the present invention, the sheet material disposed at a predetermined position between the mold halves divides the cavity formed by the mold faces of the mold halves and the window plate along the extending direction of the window plate by the injected liquid-form synthetic resin or liquid-form resin raw material forming a synthetic resin by reaction. The sheet material may be fixed to and laminated integrally with the connecting element outside the cavity by the second fixing means.

In yet another embodiment, the present invention provides a manufacturing method for a convertible top assembly, characterized in that the convertible top assembly comprises a window plate made of a transparent material that has top and back surfaces and a predetermined outer peripheral edge shape. A foldable sheet material has an outer peripheral edge shape larger than the outer peripheral edge shape of the window plate and is made of a material softer than the window plate. A connecting element made of a synthetic resin formed in an elongated form along the outer peripheral edge of the window plate with a transverse deformed shape between the vicinity of outer peripheral edge of the window plate and the vicinity of opening edge of the sheet material to integrate the window plate with the sheet material.

A first fixing means fixes the vicinity of outer peripheral edge of the window plate and the connecting element to each other. A second fixing means fixes the vicinity of opening edge of the sheet material and the connecting element to each other. The sheet material is disposed at a predetermined position between mold halves of a die having a pair of mold halves which can be separated at a division face. A cavity of a predetermined shape extending in the lengthwise direction along the outer peripheral edge of the window plate is formed by the mold face of one of the mold halves and the sheet material brought into contact with the mold face of the other of the mold halves by mold clamping of the die. The cavity is filled with a liquid-form synthetic resin or a liquid-form resin raw material forming a synthetic resin by reaction. The interior of the cavity is kept in a heated and compressed state. The connecting element is formed into a shape corresponding to the shape of the cavity by the subsequent solidification, and the connecting element is fixed integrally to the sheet material by the second fixing means, and the vicinity of the outer peripheral edge of the window plate is fixed to and laminated integrally on the connecting element outside the cavity by the second fixing means.

When a liquid-form synthetic resin or a liquid-form resin raw material forming a synthetic resin by reaction is injected to manufacture the assembly, the synthetic resin or resin raw material can be filled into the cavity without applying a high pressure.

A step portion for enfolding the vicinity of opening edge of the sheet material is formed at a position adjacent to the vicinity of outer peripheral edge on the surface of the vehicle outside or vehicle inside of the window plate of the connecting element. Thereupon, the vicinity of opening edge of the sheet material can be enfolded easily by integrally forming the step portion in advance.

The injection gate may be provided in plural numbers along the lengthwise direction of the cavity, and a liquid-form synthetic resin or a liquid-form resin raw material forming a synthetic resin may be injected from each of the injection gates. In this manner, a liquid-form synthetic resin or a liquid-form resin raw material forming a synthetic resin can be filled into the cavity without applying a high pressure. The plural injection gates may be provided at positions corresponding to at least a pair of opposed portions in the vicinity of outer peripheral edge of the window plat and a liquid-form synthetic resin or a liquid-form resin raw material forming a synthetic resin is injected from each of the injection gates at overlapping timing. Compressive forces in the face direction applied to the window plate by the injected liquid-form synthetic resin or liquid-form resin raw material forming a synthetic resin are canceled each other.

In this manner, the window plate can be positioned exactly in the die without a positional shift by the injected liquid-form synthetic resin or liquid-form resin raw material, and also the window plate can be prevented from being scratched.

The sheet material may be removed in advance so that the opening edge of the same or similar shape as or to the outer peripheral shape of the window plate. A separation line may be formed along the inner peripheral edge of the connecting element in the sheet material integrated with the connecting element to remove the sheet material at a portion which is not fixed to the connecting element inside the inner peripheral edge. In this manner, unnecessary sheet material is removed by using the inner peripheral edge of the connecting element as a guide.

An embossing pattern with many minute irregularities may be formed on the surface of the sheet material, and the sheet material is arranged in a direction such that the irregular face is opposed to the face of the window plate. In this manner, the buffering operation of the sheet material is further improved and the appearance is also improved.

The injected liquid-form synthetic resin may be a heated and melted liquid-form thermoplastic resin. Thereupon, according to the method in accordance with the present invention, the first and second fixing means can be effected by melting the surface of sheet material by the heat of liquid-form resin.

The connecting element may be formed in a state in which the window plate is heated to a temperature higher than normal temperature and expanded, and subsequently the window plate is cooled together with the connecting element. Thereupon, according to the method in accordance with the present invention, the window plate is disposed in the die in a state in which the window plate is heated to a temperature higher than normal temperature and expanded, and the connecting element is formed. Therefore, an internal stress from the connecting element produced on the window plate due to the cooling and solidification in the die can be relaxed, and the deformation and breakage of the window plate can be prevented.

According to the manufacturing method of the present invention, the main ingredient of the injected liquid-form resin raw material may be a mixed liquid of polyol and isocyanate. Such a mixed liquid of polyol and isocyanate has a low viscosity in injection, so that a high pressure is not needed to distribute the injected resin raw material in the cavity.

The present invention provides a manufacturing apparatus for a convertible top assembly having a pair of mold halves corresponding to a core mold and a cavity mold, and provided with a die capable of being opened and closed in a state in which a window plate made of a transparent material and having top and back surfaces and a predetermined outer peripheral edge shape and a foldable sheet material made of a material softer than the window plate are arranged on the division face of the mold halves, in which a cavity of a predetermined shape extending in the lengthwise direction along the outer peripheral edge of the window plate is formed on the division face in the die, and a part of the cavity is formed by the window plate when the die is closed, and the cavity is formed by sealing the division face in the die in a state in which holding portions of both of the mold halves adjacent to the outer peripheral edge of the cavity hold and compress the sheet material, and by sealing the division face in the die in a state in which holding portions of both of the mold halves adjacent to the inner peripheral edge of the cavity hold and compress the sheet material.

The sheet material may be positioned so as to be in close contact with the mold face of one of the mold halves. The sheet material may be positioned so that the cavity is divided into two along the extending direction of the window plate.

The present invention provides a manufacturing apparatus for an intermediate body to be integrated with a sheet material in a convertible top assembly, having a pair of mold halves corresponding to a core mold and a cavity mold, and provided with a die capable of being opened and closed in a state in which a foldable sheet material made of a material softer than the window plate is arranged on the division face of the mold halves. A cavity of a predetermined shape is formed on the division face in the die by the mold face of one of the mold halves and the sheet material in close contact with the mold face of the other of the mold halves. The cavity is formed by sealing the division face in the die in a state in which holding portions of both of the mold halves adjacent to the inner and outer peripheral edges of the cavity hold and compress the sheet material.

Removal means for forming an opening edge of the same or similar shape as or to the outer peripheral edge shape of the window plate on the sheet material may be provided integrally at the holding portion of both of the mold halves adjacent to the inner peripheral edge of the cavity. Heating means for heating and hardening first fixing means which fixes the connecting element to the window plat by hardening is additionally provided.

Thereupon, according to the apparatus in accordance with the present invention, this configuration is effective when an adhesive activated by heat is used as the first fixing means. Gap forming means, which form a gap for enfolding the vicinity of opening edge of the sheet material between the connecting means and the vicinity of outer peripheral edge on the surface on the vehicle inside or outside of the window plate, is provided between the outer peripheral edge of the window plate and the mold face of the mold half. One of the mold halves may be provided with sheet material positioning means for determining a position in the extending direction of the sheet material disposed on the division face. Thereupon, according to the apparatus in accordance with the present invention, the window plate can be positioned exactly with respect to the cavity.

Pulling means may be provided for pulling the sheet material in the outward direction of the window plate. Thereupon, according to the apparatus in accordance with the present invention, the looseness caused when the sheet material is positioned with respect to the division face of die can be removed.

The mold half may be provided with a gate for injecting a liquid-form synthetic resin or resin raw material into the cavity. The injection gate is provided in a mold half on the side on which the sheet material is not in close contact. At least one injection gate may be provided in each of the paired mold halves. The injection gate in one of the mold halves and the injection gate in the other of the mold halves may be provided at positions opposed to each other. Thereupon, according to the apparatus in accordance with the present invention, the pressure applied to the sheet material disposed at a predetermined position between the mold halves is made equal.

The injection gate may be provided in plural numbers along the lengthwise direction of the cavity, and the plural injection gates connect with one resin receiving port via a resin flow path. Thereupon, according to the apparatus in accordance with the present invention, the plural injection gates provided along the lengthwise direction of the cavity are connected to one resin receiving port via a resin flow path.

DETAILED DESCRIPTION OF THE PRESENTLY PREFERRED EMBODIMENTS

Embodiments of the present invention will be described in detail with reference to the accompanying drawings.

Figure 1:
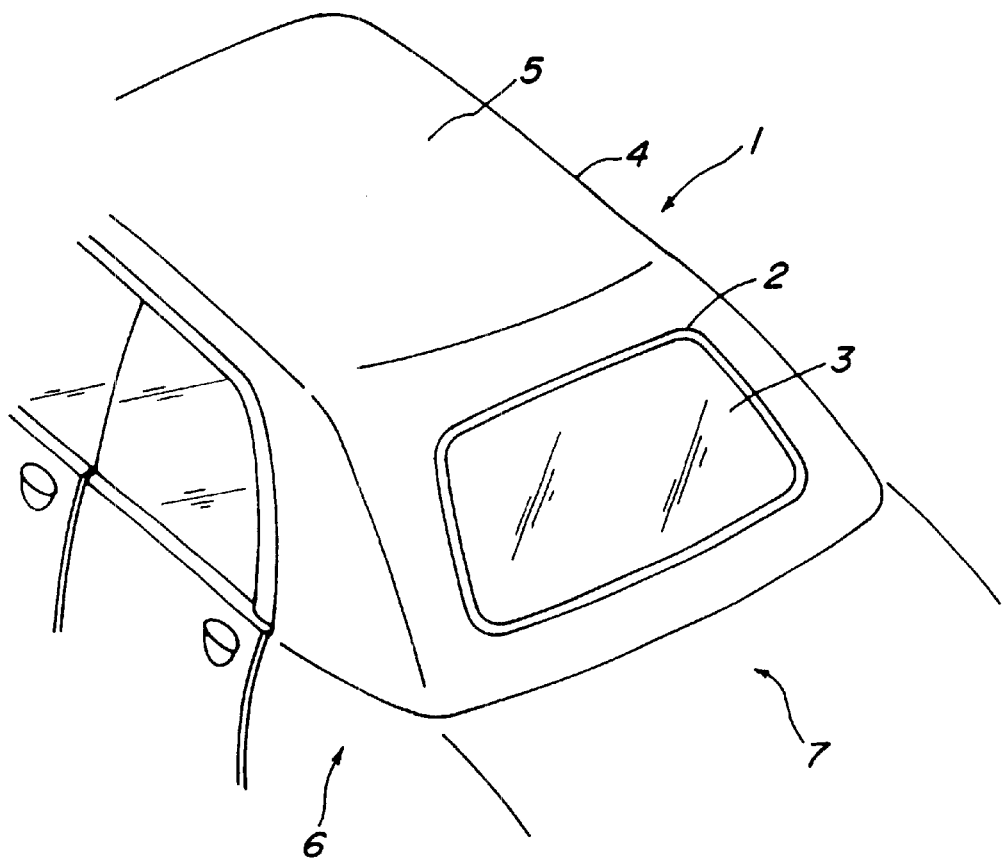
FIG. 1 is a perspective view showing a convertible top assembly in accordance with the present invention in use.

FIG. 1 is a perspective view showing a convertible top assembly in accordance with the present invention in use on an automobile. A convertible top assembly 1 shown from the upper rear of the vehicle body is a foldable canvas top or soft top, in which a window plate 3 is installed to a sheet 4 by using a frame member 2 which is a connecting element, and the sheet 4 is made of a material softer than the window plate 3.

When the convertible top assembly 1 is used, as shown in the figure, the sheet 4 is spread, extending from the front of a roof 5 to a rear fender 6 and rear trunk 7, to cover a front and rear seat (at least a rear seat), not shown. When not in use, by folding the convertible top assembly 1 to the rear side, the automobile can be used as an open convertible vehicle whose top roof is open. Also, such a product can be applied to not only an open convertible vehicle but also a four-wheel drive car, a side window for some sports utility cars, a window for a work vehicle for civil engineering and construction, agricultural vehicle, and the like, which are uses contemplated for the convertible top assembly of this specification.

The window plate should preferably be a plate material such as single inorganic glass or laminated glass which has a higher rigidity than the sheet 4 and a self shape holding property. The material should provide a surface that is less prone to be scratched, and which has a weather resistance and durability, such as a plate material of lightweight synthetic resin, for example, PC (polycarbonate) resin, PMMA (poly methyl methacrylate) resin, or PAR (polyarate) resin which has a self shape holding property. However, generally in the case of synthetic resin, especially in the case of PC resin, the material is softer than inorganic glass, and its surface is prone to be scratched.

Therefore, it is preferable that a hard coat layer such as organosiloxane be formed on the surface of plate material to increase the scratch resistance and weather resistance. The range where the hard coat is formed may be the whole of top and back surfaces of window plate, but it is preferable that the range be limited to the range other than the forming portion of the frame member 2 in consideration of the stability of fixing strength with the frame member 2, or the hard coat at the forming portion of the frame member 2 be removed. The planar shape of the window plate 3 may be a flat plate shape or a curved shape which is convex slightly toward the outside of vehicle body. The outer peripheral shape of the window plate 3 may be triangular, circular, etc. as well as rectangular as shown in FIG. 1 depending on the style of vehicle.

Figure 2:
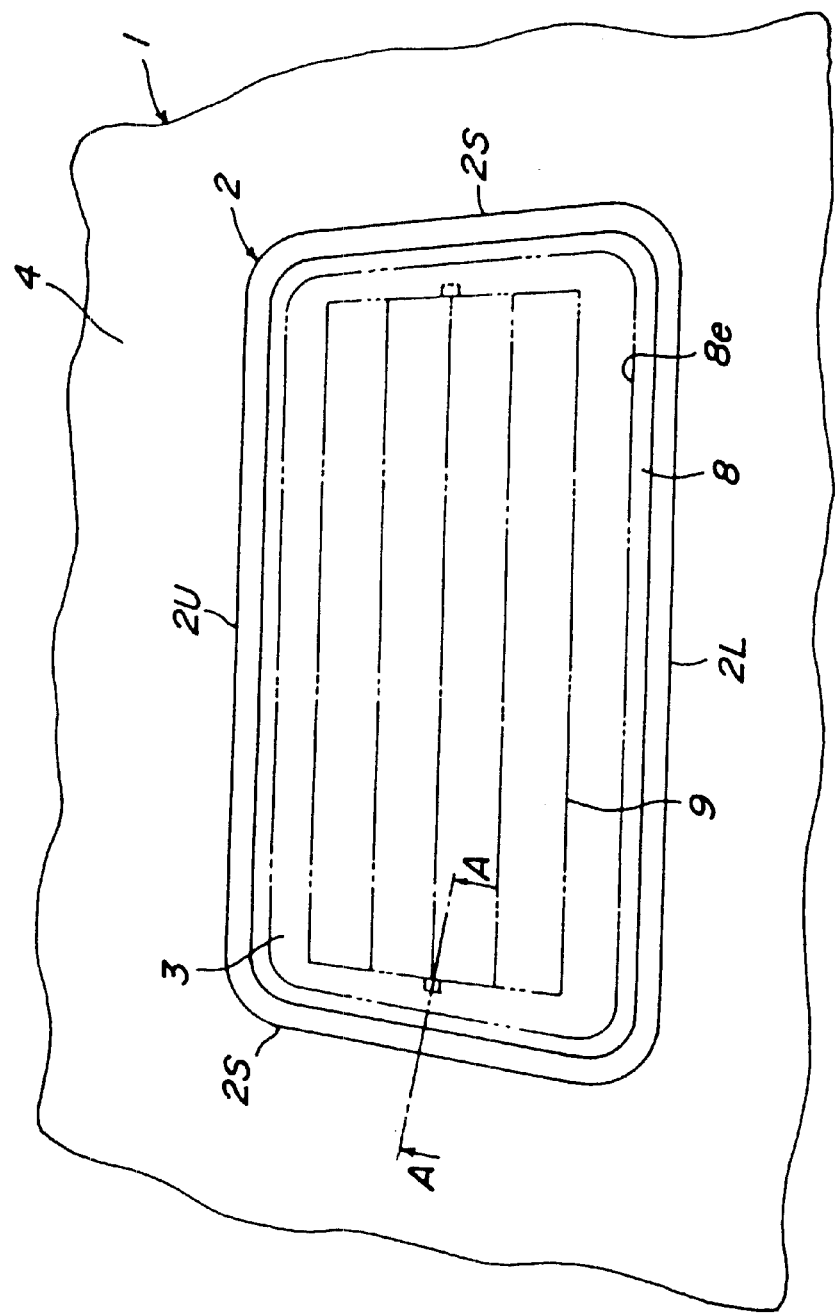
FIG. 2 is an enlarged view of a principal portion of FIG. 1.

FIG. 2 is an enlarged view showing the vicinity of the window plate 3. The same reference numerals are applied to the same elements as those in FIG. 1, and the explanation of those elements is omitted. The frame member 2 as a connecting element, which is made by solidifying a liquid-form thermoplastic synthetic resin filled with the sheet and the window plate being interposed or a liquid-form resin raw material forming a synthetic resin by reaction in a cavity of a later-described frame member forming mold, and formed into an elongated member along the outer peripheral edge 3e of the window plate 3, connecting the window plate 3 to the sheet 4. The cross-sectional shape of the frame member 2 may be the same shape over the whole periphery of an upper portion 2U, a lower portion 2L, and side portions 2S, or may be different at each portions.

For example, when the convertible top assembly is in use, in addition to the spreading of the sheet 4, especially the upper portion 2U is subject to a greater vertical tensile force than the lower portion 2L by the influence of the gravity on the window plate 3. Therefore, the upper portion 2U has a larger contact area (fixing area) of the frame member 2 with the window plate 3 and the sheet 4 than the contact area at other portions (the lower portion 2L and side portions 2S). Thereby, the tensile stress applied to the upper portion 2U is reduced, and a stable fixing state can be obtained.

On the surface on the vehicle inside in the vicinity of the outer peripheral edge of the window plate 3, an opaque colored layer 8 having an inner periphery 8e is formed in advance. The material and forming method thereof are different depending on the material of the window plate 3. Specifically, it is preferable that when the window plate 3 is made of inorganic glass, the opaque colored layer 8 be formed by welding a frit or by color painting, and when the window plate 3 is made of synthetic resin, the opaque colored layer 8 be formed by color painting. Reference numeral 9 in the figure denotes a hot wire print (usually called a buss bar) which is provided on the surface on the vehicle inside of the window and used as heating antidim means.

Next, a first embodiment of the convertible top assembly in accordance with the present invention will be described in detail in terms of the cross-sectional shape of the frame member 2. Hereinafter, regarding all embodiments, the direction toward the center of the window plate along the window surface is called the inward direction, and the direction expanding radially from the center of window plate along the window surface is called the outward direction. The outer and inner peripheral edges used in the explanation are defined corresponding to these outward and inward directions.

Figure 3:
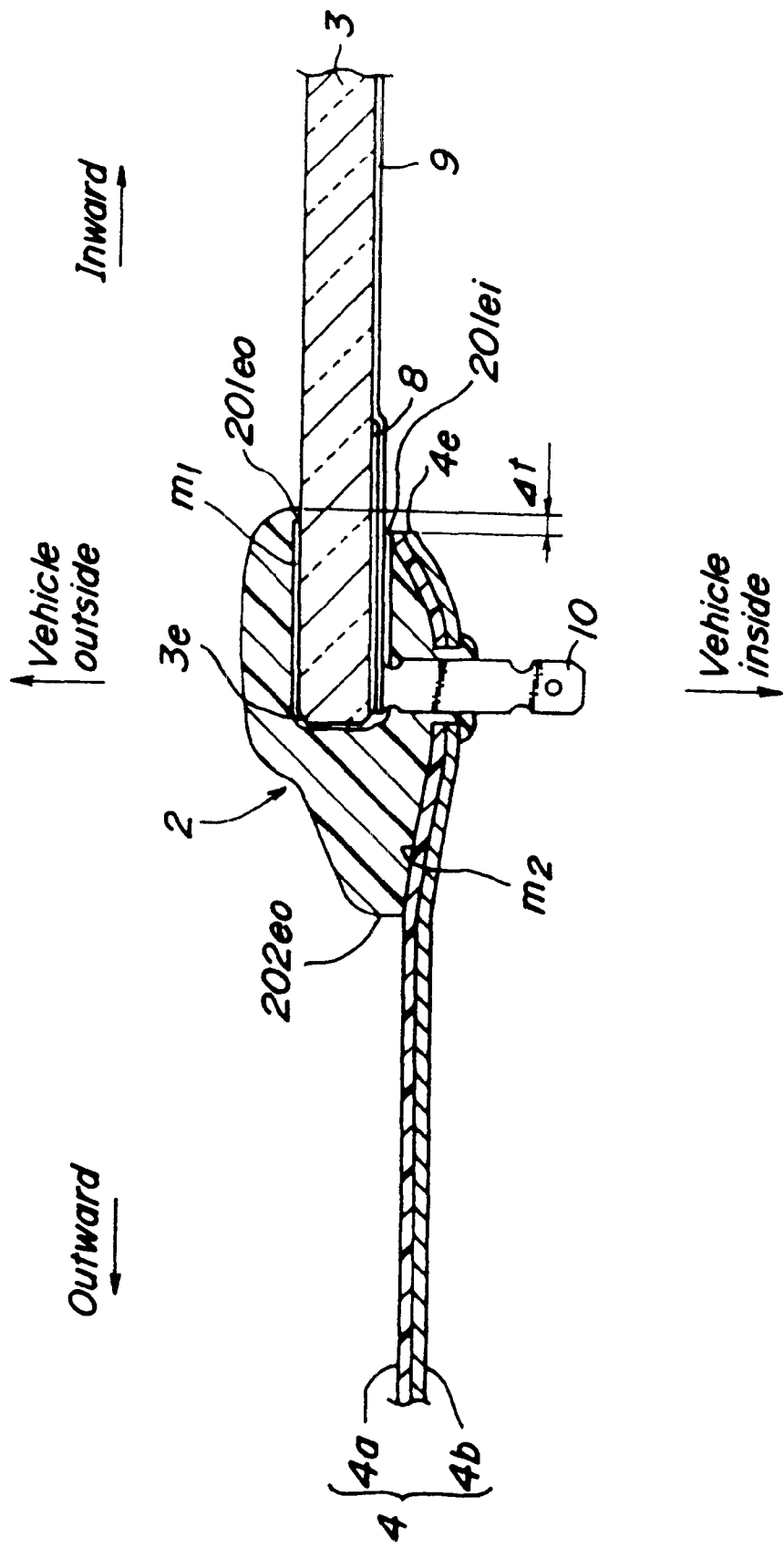
FIG. 3 is a sectional view taken along the line A—A of FIG. 2, showing the assembly of a first embodiment.

FIG. 3 is a sectional view taken along the line A—A of FIG. 2, showing a state in which the window plate 3 is arranged and fixed on the vehicle outside from the sheet 4. As shown in FIG. 2, the shape of an outer peripheral edge 3e of the window plate 3 is substantially trapezoidal shape, but the shape of the window plate 3 is not limited to a trapezoidal shape. The sheet 4 is a sheet material having an opening edge portion 4e substantially corresponding to the shape of the outer peripheral edge 3e of the window plate 3. The frame member 2 is provided at a portion where the vicinity of the opening edge 4e of sheet laps on the vicinity of the outer peripheral edge 3e of window plate, and is visible from the vehicle outside, but is covered by the sheet 4 so that it is invisible from the vehicle outside.

The frame member 2 is formed by solidifying a liquid-form synthetic resin filled into a cavity formed into a shape corresponding to the shape of the frame member 2 on the surface of a separable injection die, or a liquid-form resin raw material forming a synthetic resin by reaction. In this embodiment, an inner peripheral edge $201ei$ on the vehicle outside of the frame member is solidified in a state such as to cover the vicinity of the outer peripheral edge 3e of window plate. The fixing of the frame member 2 and the window plate 3 is performed via an adhesive layer, which is first fixing means $m_1$, formed in advance in the range in which the frame member 2 is formed.

However, when the window plate 3 is made of a synthetic resin, in place of the first fixing means $m_1$ of an adhesive layer or in addition to this, mechanical means can be used in which many through holes or undercut-shape notches are formed along the frame member 2 in the vicinity of the outer peripheral edge 3e of window plate, and a liquid resin is poured in the through holes or notches, by which the fixing is performed.

Similarly, an outer peripheral edge $202eo$ on the vehicle outside of the frame member is solidified in a state such as to cover the vicinity of the opening edge 4e of sheet from the vehicle outside. The fixing of the frame member 2 and one surface of the sheet 4 is performed by a weld portion as second fixing means $m_2$. In this case, the sheet 4 at the portion contacting with the frame member 2 is welded wholly, so that a higher fixing strength can be obtained than the case of, for example, partial high frequency welding. Also, since the contacting portion of the frame member 2 and the sheet 4 is non-planar, the contact area can be kept larger than the planar shape, which is advantageous in improving the fixing strength.

When the rigidity of the window plate 3 is insufficient as a whole, the frame member 2 can be formed and reinforced by a synthetic resin which is hard and rigid, including, for example, engineering plastics such as hard PVC (polyvinyl chloride) resin, ABS (acrylonitrile-butadien styrene) resin, or PPO (polyphenylene oxide) resin, or a polymer alloy (mixed plastic) of these resins. Further, in order to increase the strength, a resin can be used in which a reinforcing material such as glass fiber is mixed in these resins. The inner peripheral edge 201eo on the vehicle outside of the frame member is extended in the inner periphery direction by a dimension difference t from the opening edge 4e of sheet on the vehicle inside and an inner peripheral edge 201ei on the vehicle inside of the frame member 2, by which the opening edge 4e of sheet and an inner peripheral edge 201ei on the vehicle inside of the frame member 2 can be less visible through the window plate 3 from the vehicle outside. In this case, the opaque colored layer 8 can be made unnecessary.

For the sheet 4, either a resin sheet 4a or a water-proof woven cloth 4b can be used, but a sheet material in which the resin sheet 4a and the woven cloth 4b are laminated is preferable. For the resin sheet 4a, a water-proof resin sheet or film which prevents the entrance of rainwater is used. For stabilizing the later-described molding of frame member and from the viewpoint of style, the resin sheet with a finely embossed surface is preferable. Specifically, a soft PVC resin sheet is preferable. As the woven cloth 4b, a cloth such as canvas that can withstand a substantial tensile strength when the tensile strength is applied to the sheet 4 during the use of the assembly is desirable.

Especially regarding the material of the resin sheet 4a, a synthetic resin sheet made of a material which is mutually soluble with the frame member 2 is preferable. However, if the sheet is not mutually soluble with the frame member 2 or a sufficient welding strength cannot be obtained even if being mutually soluble, or if the woven cloth 4b is used by being disposed on the frame member 2 side, an adhesive layer is formed as second fixing means $m_2$ in advance at the contact portion with the frame member 2. The sheet 4 may be a sheet in which the resin sheet 4a is laminated on both surfaces of the woven cloth 4b.

The colors of the sheet 4 and the frame member 2 are preferably the same or of the same system for the purpose such that even if some resin leakage, burrs, etc. occur on the sheet 4 in relation to the later-described manufacturing method, these defects are not conspicuous. Specifically, black containing carbon or black system color is especially preferable from the viewpoint of quality such as weather resistance.

The hot wire print 9 is electrically connected by soldering or brazing to a hot wire print terminal 10 which is formed into a substantially L shape from a metal plate. After a part of the base of the L-shaped terminal 10 is buried and fixed, the hot wire print 9 may be brazed with the L-shaped terminal 10 partially exposed.

Figure 4:
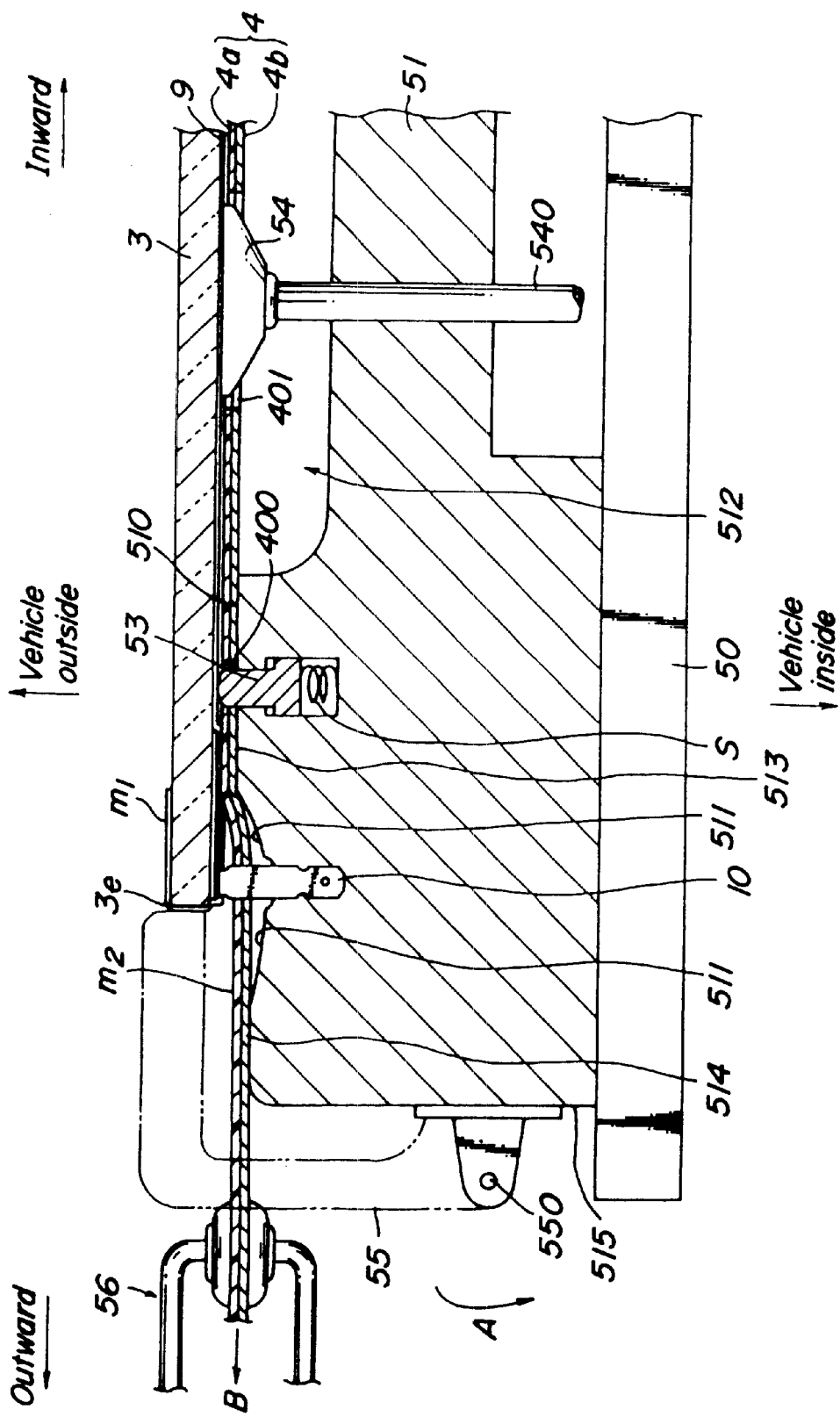
FIG. 4 is a sectional view showing a core mold of an apparatus in accordance with the present invention.
Figure 5:
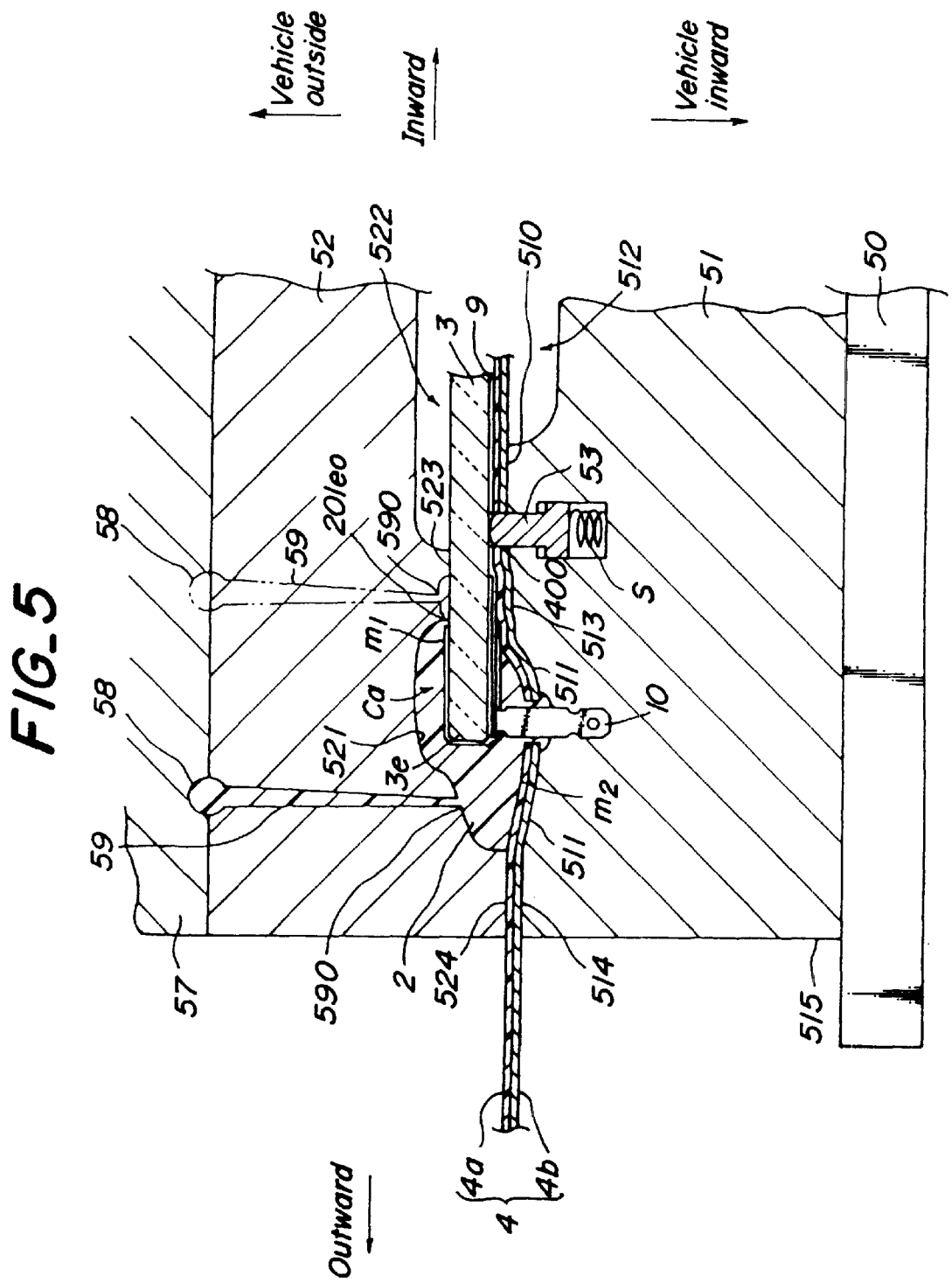
FIG. 5 is a sectional view showing a state in which a core mold and a cavity mold of the apparatus in accordance with the present invention are closed.
Figure 6:
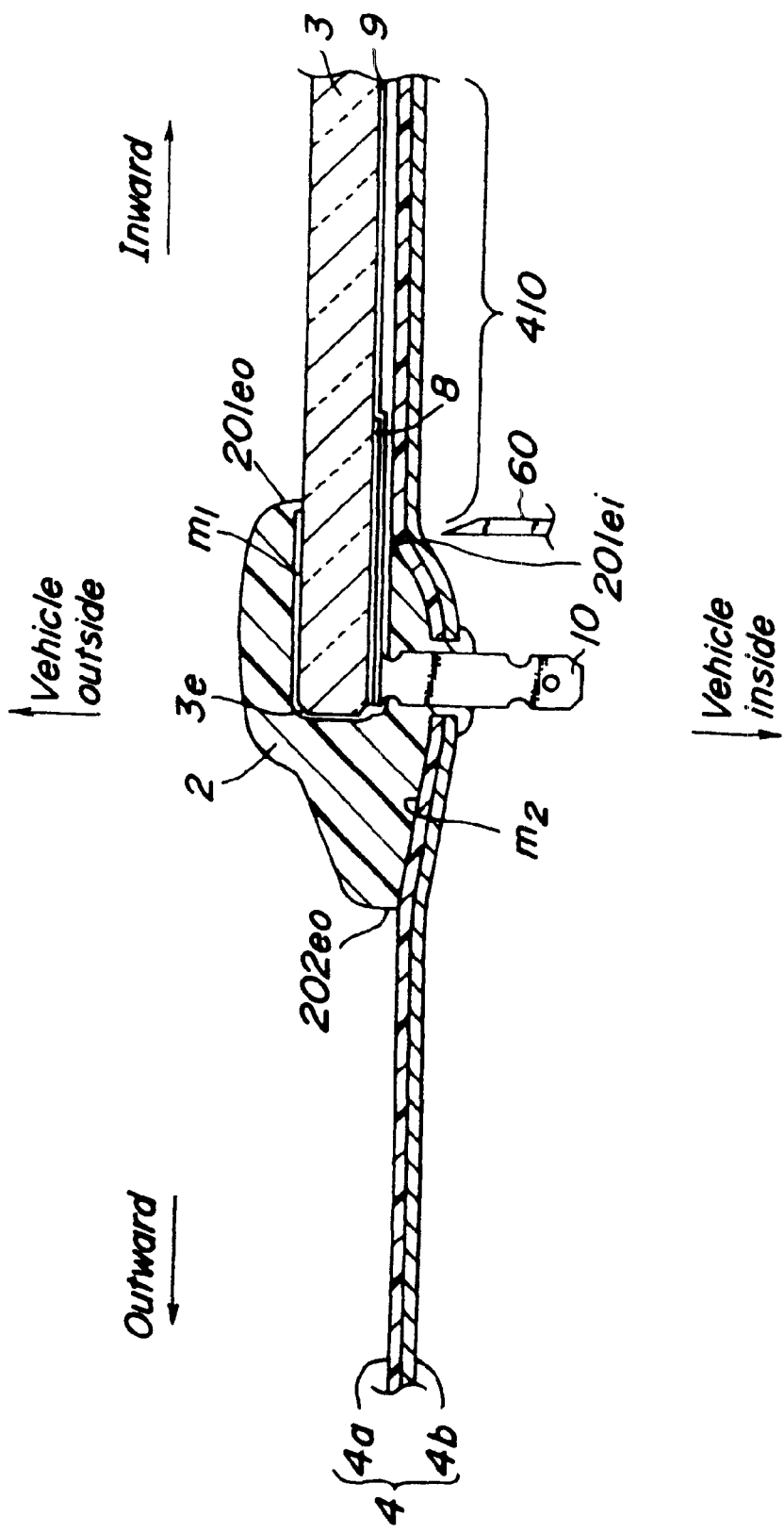
FIG. 6 is a view for illustrating a process in which a sheet material is trimmed to complete the assembly of the first embodiment.

Next, the manufacturing method and apparatus for the convertible top assembly in accordance with the present invention will be described in detail with reference to the accompanying drawings. FIGS. 4 and 5 show a first embodiment of the apparatus in accordance with the present invention, being sectional views showing a forming portion of an injection die for forming the assembly shown in FIG. 3. FIG. 6 is a view for illustrating a process in which a sheet of assembly intermediate body removed from the die is trimmed at a portion corresponding to A—A cross section. The same reference numerals are applied to the same elements as those shown in FIGS. 1 to 3.

The manufacturing apparatus of this embodiment has a core mold 51 of one mold half and a cavity mold 52 (see FIG. 5) of the other mold half, which constitute a steel injection die separable at the division face, on a die plate 50. A liquid-form synthetic resin, or a liquid-form resin raw material forming a synthetic resin by reaction is injected into a cavity Ca formed between these mating faces (division faces). Thereby, the frame member 2 is injection molded, and the window plate 3 and the sheet 4 are connected integrally by the frame member 2.

Referring to FIG. 4 in which the cavity mold 52 is omitted, the core mold 51 has a mold face 511 for forming the cavity Ca on the division face 510, and has a concave 512 for preventing the contact with the window plate 3 at the center of the window plate 3. Reference numeral 53 denotes a pin for positioning the sheet 4 at a predetermined position with respect to the cavity 511. This positioning pin 53 is urged to the window plate 3 side by a compression spring S etc. The tip end of the pin usually protrudes from the division face 510 of the core mold, and is inserted in a positioning hole 400 formed in advance in a sheet 4, so that the sheet 4 is fixed to a predetermined position. The concave 512 is provided with a vacuum suction cup 54 for positioning and fixing the window plate 3. This vacuum suction cup 54 is connected to a vacuum producing source (not shown) such as a vacuum pump via a suction pipe 540.

In addition, the core mold 51 is provided with an arm 55 for positioning the outer peripheral edge 3e of the window plate 3 with respect to the cavity Ca on the division face 510. This positioning arm 55 rotates around a shaft 550. In positioning the window plate 3, the arm 55 is located at the position shown in FIG. 4, and in mold clamping, it retracts in the direction indicated by the arrow A. Further, on the outside apart from a side surface 515 of the core mold 51, a sheet clamp 56, which is pulling means, is provided. This sheet clamp 56 clamps the sheet 4 and moves in the direction indicated by the arrow B, by which the looseness of the sheet 4 is prevented from occurring before the frame member 2 is formed.

FIG. 5 is a sectional view of an injection die in a state in which mold clamping is performed by the core mold 51 and the cavity mold 52, in which the positioning arm 55 and the sheet clamp 56 are omitted. The cavity mold 52 has a mold face 521 for forming the cavity Ca on the mating face with the core mold 51, and has a concave 522 for preventing the contact with the window plate 3. The mating face with a runner plate 57 is formed with a runner 58 connecting with a resin receiver (not shown) for receiving resin from an injection nozzle of an injection molding machine, not shown. A liquid-form synthetic resin or a liquid-form resin raw material forming a synthetic resin by reaction is supplied in the cavity Ca via a pin point type injection gate 590 formed at the position indicated by the solid line, where no bending moment is produced on the window plate 3 protruding in a cantilever state in the cavity Ca, from the runner 58 through a sprue 59.

When resin is distributed sufficiently in the cavity Ca, the sprue 59 and the gate 590, which are a resin flow path, may be provided at one location indicated by the solid line. However, when a liquid-form resin which has a high viscosity, in other words, a poor flowability is used, it is preferable that a plurality of resin flow paths (59, 590) be provided additionally along the lengthwise direction of the cavity Ca. In this case, it is preferable that the injection gates 590 be provided at positions at least corresponding to a pair of opposite portions at the outer peripheral edge of the window plate 3, or in the vicinities of a pair of opposite corners. Thereby, if a liquid-form resin is injected at overlapping timing, preferably at the same timing, the pushing force of resin acting in the inside direction (face direction center) of the window plate 3 at the outer peripheral edge 3e of the window plate 3 is offset, whereby the window plate 3 can be prevented from shifting in the face direction in the die. Also, the exact positioning can be maintained during the molding, so that the window plate 3 is not damaged.

In the above embodiment, a trace of at least one injection gate remains on the surface on the vehicle outside of the frame member 2. If this is unpreferable, the sprue 59 and the gate 590 can be provided at the position indicated by the two-dot chain line in FIG. 5. In this case, the gate 590 portion indicated by the two-dot chain line is cut to form the inner peripheral edge 201eo on the vehicle outside of the frame member 2.

Reference numeral 60 in FIG. 6 denotes a cutter such as a knife for trimming an excess sheet material by making a cut in the sheet integrated with the frame member 2 by injection molding. For the position where a cut is made, the work in which the inner peripheral edge 201ei on the vehicle inside of the frame member 2 is used as a guide and a cut is made along this edge is preferable because this work can be performed easily and exactly. Also, in the case where the surface of window plate is scratched if the aforesaid cutter is used, manual or electrical scissors may be used.

Next, the manufacturing method for the assembly, which is a first embodiment, will be described in the sequence of process with reference to FIGS. 4 to 6.

First, as a first step, the sheet 4 is placed on the core mold 51 with the die being open and the positioning is performed. Specifically, the positioning is performed by aligning the positioning hole 400 formed in advance in the sheet 4 with the positioning pin 53 as shown in FIG. 4. When the window plate 3 is placed, the positioning pin 53 pushes the surface on the vehicle inside of the window plate 3. Therefore, the material of the positioning pin 53 is preferably a material which is less prone to cause scratches, cracks, and other damages on the window plate 3 and is softer and more wear-resistant than the window plate 3 (for example, polyacetal resin). Also, the shape of the positioning pin 53 should preferably be such that the tip end of pin is of a tapered circular shape. Thereby, in addition to the above-mentioned effects, the insertion in the positioning hole 400 is made easy, so that the workability is improved.

In a second step, the window plate 3 is placed, and the positioning is performed. Specifically, the positioning is performed by making the outer peripheral edge 3e of the window plate 3 abut on the positioning arm 55 as shown in FIG. 4. Thereby, the outer peripheral edge 3e of the window plate 3 is positioned exactly with respect to the cavity Ca. In the range in the vicinity of the outer peripheral edge 3e of the window plate 3 where the frame member 2 is formed subsequently, the first fixing means $m_1$ of adhesive layer is formed in advance. Also, it is preferable that the window plate 3 be heated wholly to a temperature above normal temperature (about 60 to 130 C in the case of inorganic glass pane) and the outer peripheral edge shape be thermally expanded as compared with the shape at normal temperature until the frame member 2 is formed. Thereby, an internal stress caused on the window plate from the frame member due to the cooling and solidification during the forming process is relaxed, and the deformation or breakage of the window plate can be prevented.

In a third step, the window plate 3 is temporarily fixed with the vacuum suction cup 54 protruding from a suction cup relief hole 401 formed in the sheet 4. This temporary fixing is performed by evacuating the vacuum suction cup 54 connected to the suction pipe 540 as shown in FIG. 4. The means for temporarily fixing the window plate 3 may be any means as well as the vacuum suction cup 54.

In a fourth step, the positioning arm 55 is turned and the structure is removed to the outside of mold. This is performed by turning the positioning arm 55 in the direction indicated by the arrow A as shown in FIG. 4. Thereby, the positioning of the window plate 3 and the sheet 4 is completed. When the window plate 3 is placed at an exact position by using a pick and place robot etc., this positioning arm 55 is not necessarily needed.

In a fifth step, the looseness of the sheet 4 is removed. This is performed by moving a sheet clamp 56 holding a part of the sheet 4 in the direction indicated by the arrow B and by pulling the sheet 4 to four directions as shown in FIG. 4. Also, in place of the sheet clamp 56, like the principle of an embroidery ring, described later, on the division face at the position outside the cavity Ca, an annular groove is formed in one mold half, and a ridge is formed at the corresponding position on the other mold half, and by fitting the ridge in the groove in mold clamping, a pulling force may be given to the sheet 4.

In a sixth step, as shown in FIG. 5, the core mold 51 and the cavity mold 52 are put together and clamped. A liquid-form synthetic resin is injected into the cavity Ca formed by the mold face 511 covered by the sheet 4 of the core mold 51, the mold face 521 of the cavity mold 52, and the surface in the vicinity of the outer peripheral edge 3e of the window plate 3, by which injection molding is performed. That is, the injection molding is performed by injecting a heated and melted liquid-form thermoplastic synthetic resin or liquid-form resin raw material forming a synthetic resin by reaction into the cavity Ca through the pin point type injection gate 590 of the sprue 59. However, when a plurality of injection gates 590 are provided along the lengthwise direction of the cavity Ca, it is preferable to inject a liquid-form resin at overlapping timing through the respective injection gate. Thereby, as described above, the compressive forces in the face direction of the window plate 3 acting due to the pressure of the injected liquid-form resin can be canceled. The liquid-form synthetic resin in this embodiment is a thermoplastic synthetic resin such as soft PVC or TPE (thermoplastic elastomer), which is softened and made flowable by heating, and solidified by cooling. Thereby, the window plate 3 and the sheet 4 can be integrated with the frame member 2. The following is a more detailed description of this process.

When mold clamping is performed with the window plate 3 and the sheet 4 being held between the division faces of the core mold 51 and the cavity mold 52, the cavity Ca is formed in the die. This cavity Ca is formed by the sheet 4 in contact with the mold face 511, the mold face 521 of the cavity mold 52, and the surface in the vicinity of the outer peripheral edge 3e of the window plate 3, extends along the lengthwise direction of the outer peripheral edge 3e of the window plate 3, and corresponds to the shape of the desired frame member to be formed. In this state, a heated and melted thermoplastic synthetic resin is injected into the cavity Ca through the injection gate 590 via the sprue 59. At this time, as shown in FIG. 5, the resin injected through the gate 590 indicated by the solid line slightly outward from the outer peripheral edge of the window plate 3 does not collide directly with the window plate 3 which is in a state of cantilever protruding in the cavity Ca, so that no bending moment is produced on the window plate 3. Therefore, when the material of the window plate 3 is inorganic glass, the breakage and crack are prevented, and when the material of the window plate 3 is synthetic resin, the deformation is prevented.

The injected resin collides with the mold face 511 of the core mold 51 covered by the sheet 4, is first filled into the cavity Ca in the vicinity of the injection gate 590, and then flows in the lengthwise direction and fills the whole cavity Ca. When the resin is injected and when the injected resin flows in the cavity Ca, the sheet 4 is somewhat softened by being heated by the heat of the melted resin, and extended by the injection pressure of the injected resin in the cavity Ca, being pushed against the mold face of the core mold 51, so that it is formed into a shape along the shape of mold face. Thereby, the frame member 2 is formed, and the sheet 4 is laminated and integrated on the surface of the frame member 2.

Whereas, the window plate 3 and the frame member 2 are subject to the heat of liquid-form resin forming the frame member and the injection pressure, the adhesive layer, which is the first fixing means $m_1$, is activated, and the outer peripheral edge face of the window plate 3 and the frame member 2 are fixed strongly to each other by bonding. When an inorganic glass pane is used as the window plate 3 and a soft or semi-hard PVC resin is used as the frame member 2, an adhesive consisting mainly of acrylic modified phenol resin can be used as the first fixing means $m_1$. Specifically, for example, "Hamatite (trade name) Y6500" made by The Yokohama Rubber Co., Ltd. can be used.

When the resin sheet 4a of the sheet 4 is mutually soluble with the injected resin, the surface of the resin sheet 4a is somewhat melted by the conduction heat of the injected resin, melted together with the resin forming the frame member 2, and welded by the action of the pressure of the injected resin, by which the fixing is strengthened. In this case, the welding portion is the second fixing means $m_2$. When a soft PVC resin is used as the resin forming the frame member 2, it is preferable that the injected resin be heated to a temperature of about 200 to 220 C for melting.

When the same adhesive layer as the aforementioned first fixing means m is formed in advance as the second fixing means $m_2$ on the sheet at a portion where the frame member 2 is formed, the bonding is accomplished with this adhesive by the synergistic action of the conduction heat from the injected resin and the pressure of the resin, so that a strong fixing can be attained at this time as well.

Also, one side of the substantially L-shaped terminal 10 is in contact with the surface on the vehicle inside of the window plate 3 and extends in parallel with the surface, the tip end thereof reaching the hot wire print 9. At this portion, the base portion of the other side of the terminal 10 extending substantially perpendicularly from the window plate surface in a state such as to be soldered to the hot wire print 9 is buried in the resin at the same time when the frame member 2 is formed, by which the fixing to the window plate 3 is made strong.

When mold clamping is performed by the core mold 51 and the cavity mold 52 to effect injection molding, the holding portion 513 of the core mold 51 provided on the inner periphery side from the cavity Ca comes into contact with the window plate 3 via the sheet 4. For this reason, the sheet 4 acts as a buffer, so that the holding portion 513 does not damage the window plate 3. When the window plate 3 is made of glass, the occurrence of scratches and cracks can be restrained, and when the window plate 3 is made of synthetic resin, the scratching can be restrained. Also, if an embossing pattern is formed on the surface of the resin sheet 4a of the sheet 4, the surface on the vehicle inside of the window plate 3 comes into contact with the convex portions of embossing and is supported by them, so that the buffering operation is further increased.

In addition, at the holding portion 513 on the inner periphery side, the sheet 4 is compressed slightly and acts as a seal material which allows a gas to pass through but prevents a liquid from passing through. Therefore, the liquid-form synthetic resin or the liquid-form resin raw material forming a synthetic resin by reaction injected and filled into the cavity Ca is prevented from leaking from between the window plate 3 and the sheet 4, and also the air in the cavity Ca is discharged effectively. Similarly, between a holding portion 514 provided on the outer periphery side of the core mold 51 and a holding portion 524 provided on the outer periphery side of the cavity mold 52, the sheet 4 is held and compressed, so that the sealing property of the cavity Ca is similarly secured. Also, the sheet 4 covers the mold face 511 of the core mold 51, and acts as an thermally insulating material because it is formed of a material having a lower heat conductivity than that of metal.

For this reason, even if the core mold is made of a steel, the heat of the injected liquid-form thermoplastic resin is not taken away rapidly and the resin is not solidified rapidly, so that the flowable state is kept for a relatively long time. As a result, even when the cross-sectional area of the cavity Ca is relatively small and the length in the peripheral direction of the window plate 3 is relatively great, the resin flows without the need for high injection pressure and filling pressure and is filled into the cavity Ca. This operation is further increased when the window plate 3 is heated to a temperature exceeding normal temperature.

In a seventh step, the core mold 51 and the cavity mold 52 are opened, the assembly intermediate body having the solidified frame member 2 is taken out, and an unnecessary sheet portion covering the window plate 3 is trimmed from the sheet 4 fixed to the frame member 2. Specifically, as shown in FIG. 6, a cut is made on the sheet with the trimming cutter 60 such as a knife, and the sheet 4 which is made a convertible top when a product is made and a sheet 410 removed when a product is made are separated from each other.

As described above, it is preferable that the window plate 3, preferably the whole thereof, be heated to a temperature higher than normal temperature (60 to 130 C), the whole size and shape be somewhat expanded thermally, and in this state the resin be injected. Thereby, the temperature difference between the window plate 3 and the injected resin is decreased, so that the degree (temperature difference) of thermal shock applied to the window plate 3 is decreased, which contributes to the restraint on cracks when the window plate 3 is made of glass. Besides, the window plate 3 contracts with the contraction after the formation of the frame member 2, so that the relative contraction of the frame member is less, by which the occurrence of an internal stress by which the frame member 2 tightens the window plate 3 from the outside can be reduced. Thereby, the window plate 3 can be prevented from being deformed in an undesirable direction by a compressive stress, or the frame member 2 can be prevented from being cracked by a residual tensile stress.

Figure 7:
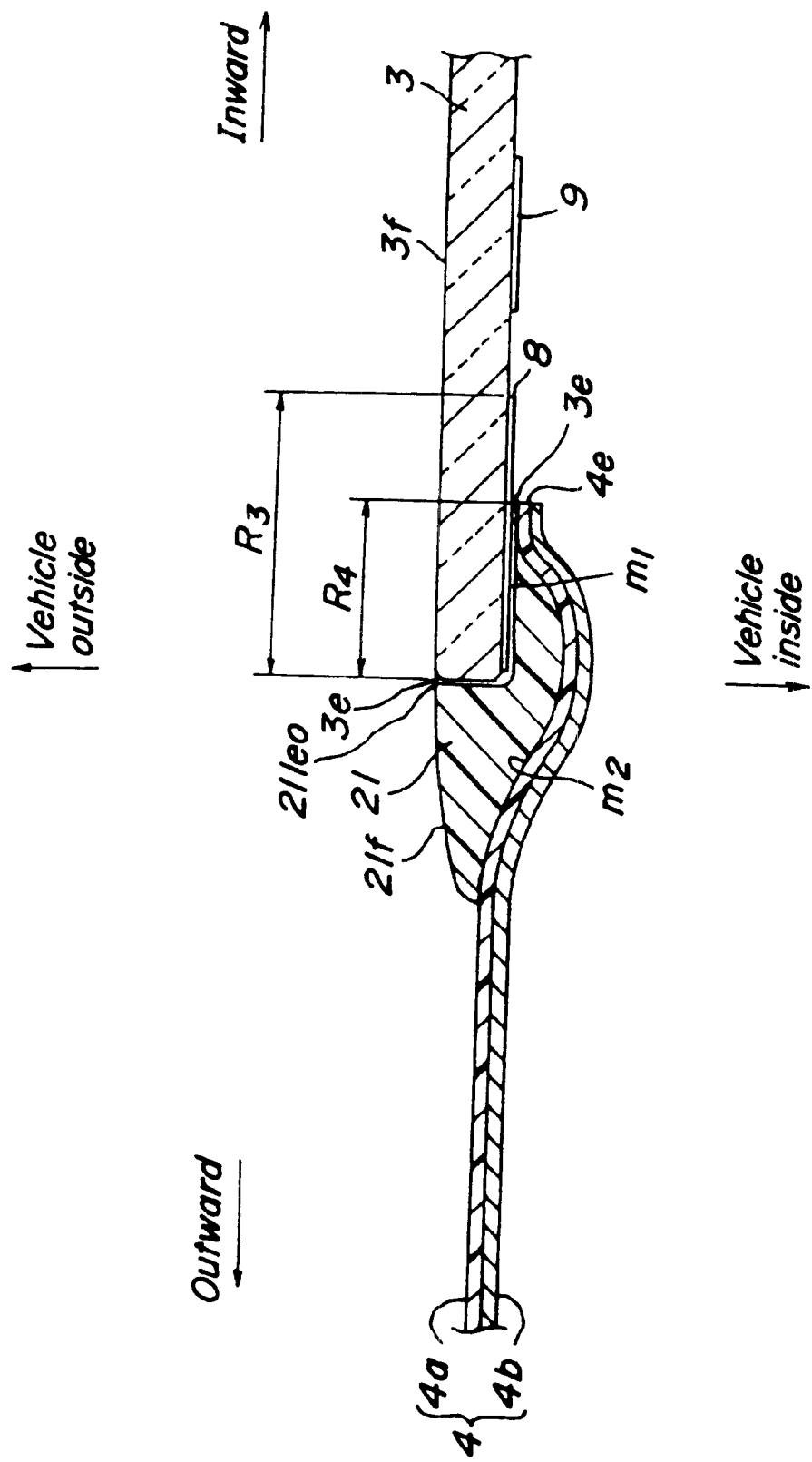
FIG. 7 is a sectional view taken along the line A—A of FIG. 2, showing the assembly of a second embodiment.

FIG. 7 is a second embodiment of the assembly, showing a state in which the window plate 3 is installed on the vehicle outside from the sheet 4. The cross-sectional shape of a frame member 21 in this embodiment shows the portion corresponding to A—A cross-section of FIG. 2. The same reference numerals are applied to the same elements as those in FIG. 3.

The frame member 21 in this embodiment does not cover the surface of the window plate 3 on the vehicle outside, and an inner peripheral edge 211eo on the vehicle outside of the frame member 21 substantially agrees with the outer peripheral edge 3e of the window plate 3 and has a flat surface shape continuing smoothly with the surface portion of the window plate 3. In this case, a surface 21f on the vehicle outside of the frame member 21 and a surface 3f on the vehicle outside of the window plate are flush with each other, so that the convertible top assembly can be made a refined style.

For the shape of this frame member 21, the frame member 21 and the vicinity of the opening edge 4e of the sheet can be seen through the window plate 3 from the vehicle outside. Therefore, if this condition is undesirable, the opaque colored layer 8 is formed on the surface on the vehicle inside in the vicinity of the outer peripheral edge 3e of the window plate so that the vicinity of the opening edge 4e of the sheet can not be seen. At this time, it is preferable that the opaque colored layer 8 be formed in a width range $R_3$ slightly wider than a width range $R_4$ at the opening edge of sheet on the surface on the vehicle inside of the window plate 3.

Figure 8:
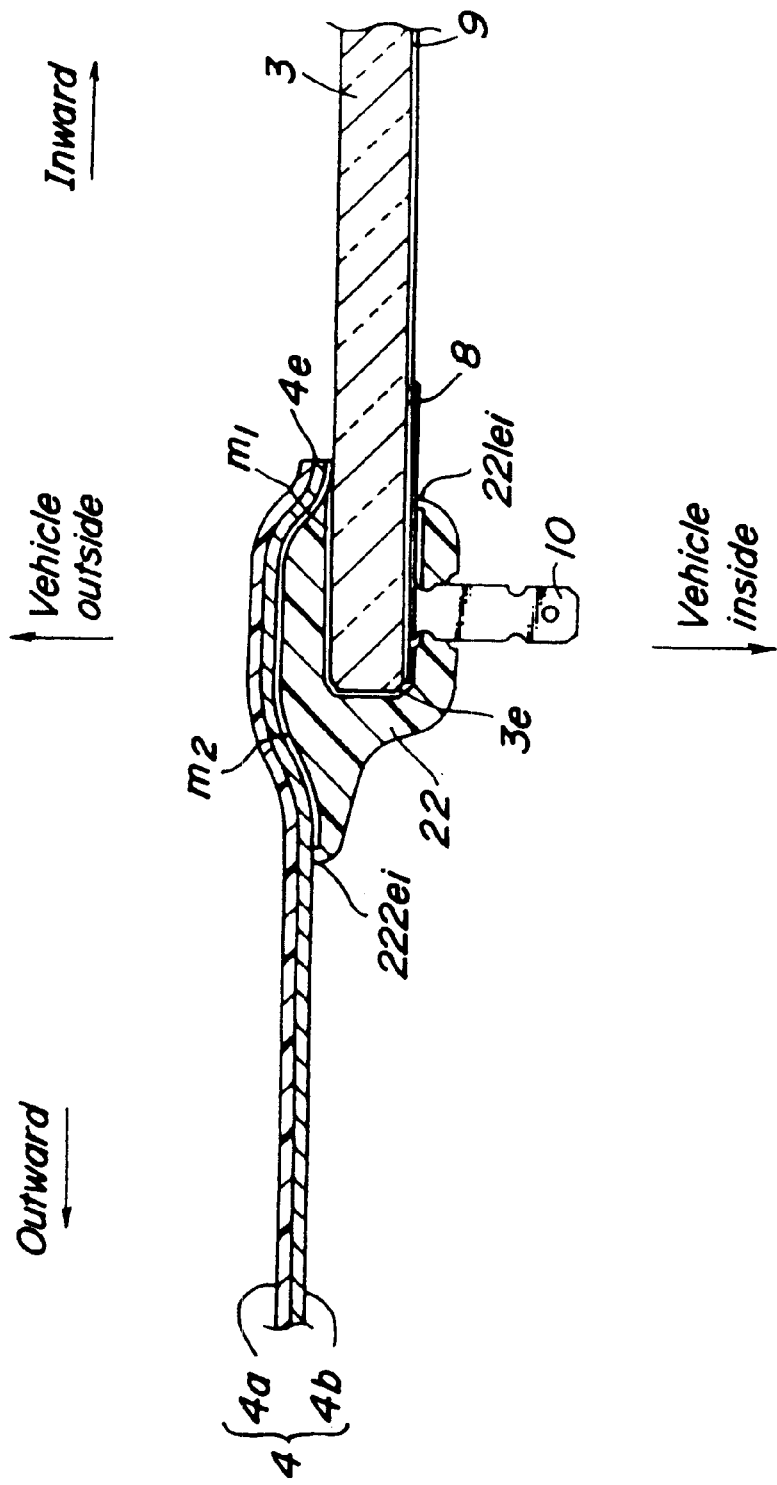
FIG. 8 is a sectional view taken along the line A—A of FIG. 2, showing the assembly of a third embodiment.

FIG. 8 shows a third embodiment of the assembly, which has a configuration in which the window plate 3 is disposed on the vehicle inside from the sheet 4. This cross-sectional shape shows the portion corresponding to A—A cross section in FIG. 2. The same reference numerals are applied to the same elements as those in FIG. 3.

A frame member 22 of the third embodiment is provided at a portion where the vicinity of the opening edge 4e of sheet and the vicinity of the outer peripheral edge 3e of window plate lap on each other, and is protected by being covered by the sheet 4 so as to be invisible from the vehicle.outside in a state in which the vicinity of the outer peripheral edge 3e of window plate is covered from the vehicle outside in the vicinity of the opening edge 4e of sheet. At an inner peripheral edge 221ei on the vehicle inside of frame member, a liquid-form resin is solidified in a state such as to cover the vicinity of the outer peripheral edge 3e of window plate, and the fixing of the frame member 22 and the window plate 3 is performed via the first fixing means $m_1$ such as an adhesive, which is similar to that of the above-described embodiment. Similarly, at an outer peripheral edge 222ei on the vehicle inside of frame member, a liquid-form resin is solidified in a state such as to cover the vicinity of the opening edge 4e of sheet, and the fixing of the frame member 22 and the sheet 4 is performed via an adhesive layer as the second fixing means $m_2$.

In the third embodiment, since the surface on the vehicle outside of the frame member 22 is protected by being covered by the sheet 4, the frame member 22 is not subject to direct sunlight, so that the synthetic resin forming the frame member 22 need not be a highly weather resistant material. As such a synthetic resin, the aforesaid PVC resin can be used. However, one method is such that a mixed liquid consisting of main ingredients of, for example, isocyanate liquid and polyol liquid is injected into the cavity Ca of the die so that a chemical reaction accompanied by heat generation takes place in the die, by which the frame member made of polyurethane resin is formed. This method is called reaction injection molding (RIM). The polyurethane resin formed by this method generally has a poor weather resistance, though having a high heat resistance. Therefore, usually, surface treatment for increasing the weather resistance is necessary, for example, by painting the portion exposed to the outside. In this embodiment, however, since the sheet 4 covers the frame member 22 from the vehicle outside, additional surface treatment such as painting is unnecessary. Also, since the frame member 22 is invisible from the vehicle outside, a style different from that of the first and second embodiments can be achieved. When the RIM method is used, since the mixed liquid has a lower viscosity than the heated and melted liquid-form thermoplastic resin, even for an elongated cavity, a high injection pressure is not needed, and the liquid can be distributed sufficiently.

Figure 9:
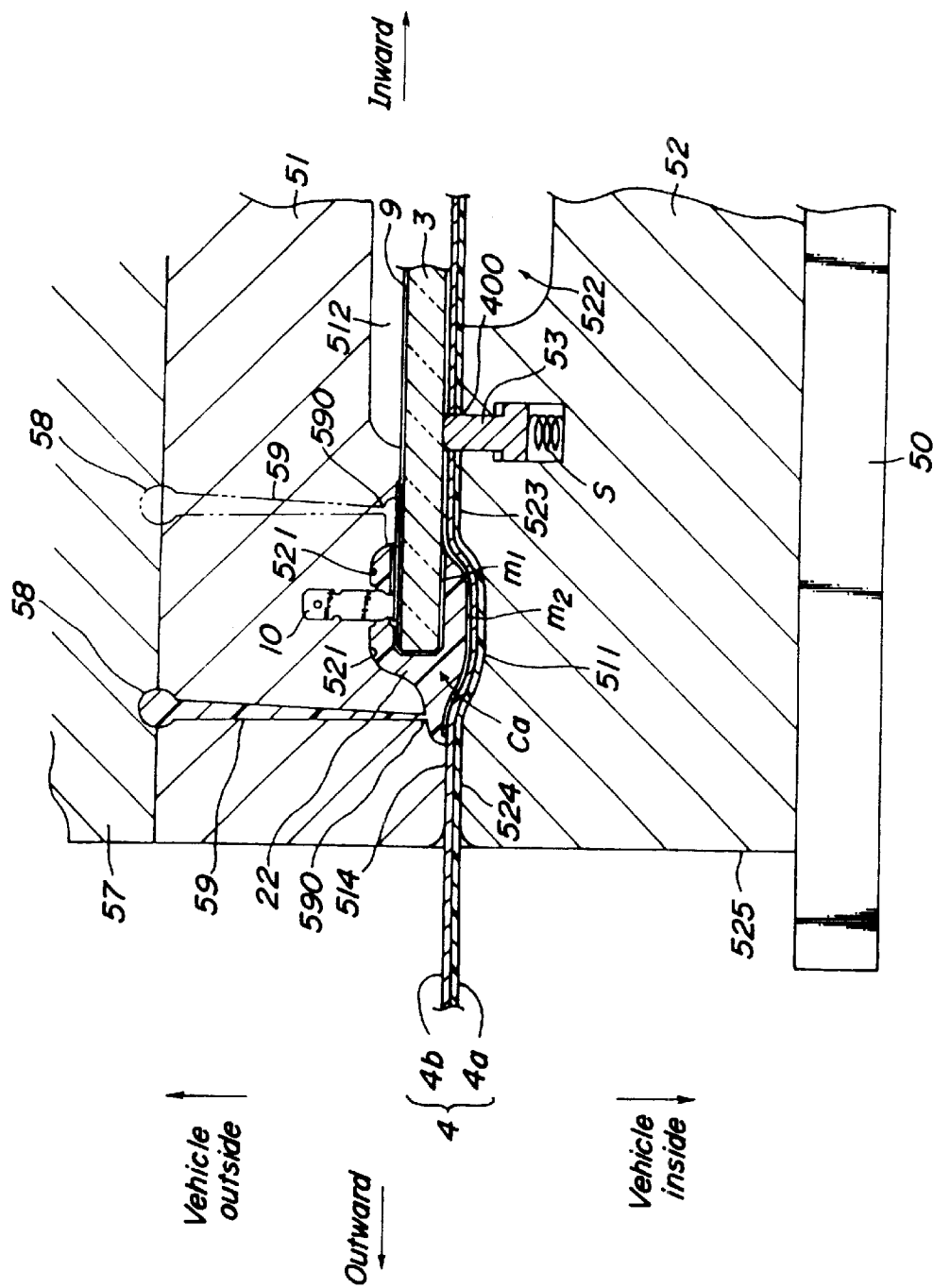
FIG. 9 is a sectional view showing a state in which a core mold and a cavity mold of the apparatus of a second embodiment in accordance with the present invention are closed.
Figure 10:
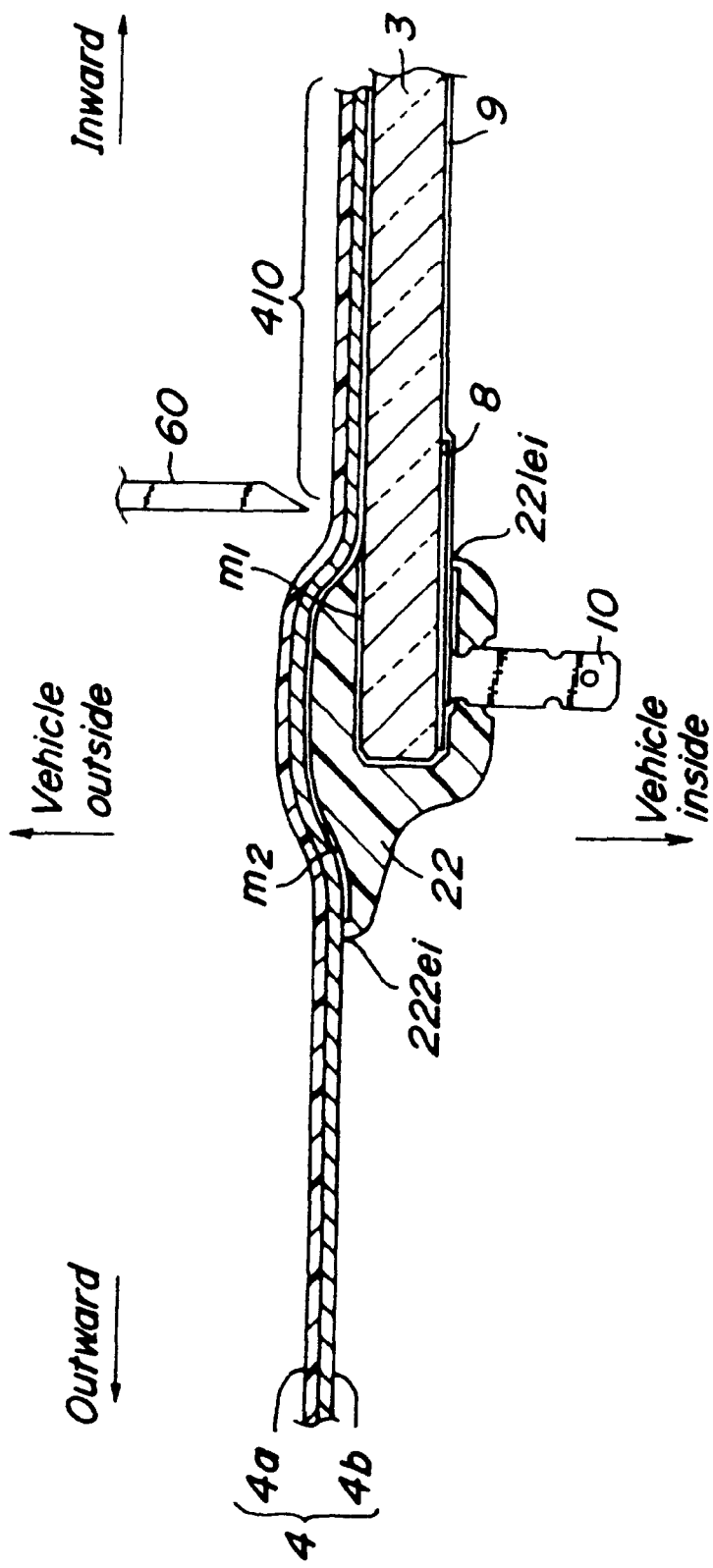
FIG. 10 is a view for illustrating a process in which a sheet material is trimmed to complete the assembly of the third embodiment.

FIG. 9 shows a second embodiment of the apparatus in accordance with the present invention for manufacturing the assembly shown in FIG. 8, being a sectional view showing a forming portion of an injection die. FIG. 10 is a view corresponding to A—A cross section for illustrating a process in which a sheet of assembly intermediate body removed from the die is trimmed at a portion. In FIGS. 9 and 10, the same reference numerals are applied to the same elements as those shown in FIGS. 4 to 6.

The apparatus of the second embodiment has, like the apparatus of the first embodiment, the core mold 51 of one mold half and the cavity mold 52 of the other mold half, which are separable, on the die plate 50. A liquid-form synthetic resin or a liquid-form resin raw material forming a synthetic resin by reaction is injected into the cavity Ca formed between these mating faces (division faces). Thereby, the assembly of the third embodiment is manufactured by injection molding.

The difference from the first embodiment is that the window plate 3 is disposed on the core mold 51 side and the sheet 4 is disposed on the cavity mold 52 side. That is, the positioning pin 53 and the vacuum suction cup 54 (not shown) are provided on the cavity mold 52 side, and the positioning arm 55 (not shown) is also provided on the cavity mold 52 side. Also, at the side distant from a side face 52S, the sheet pulling clamp 56 (not shown) is provided. Further, the runner 58 is formed at the mating face between the core mold 51 and the runner plate 57, and the sprue 59 and the injection gate 590 are provided in the core mold 51.

In this embodiment, the work is carried out by following first to seventh steps, like the first embodiment. In the first step where the sheet 4 is positioned in the cavity mold 52, the resin sheet 4a forming the surface on the vehicle outside is disposed in the direction such as to face the mold face of the cavity mold 52, and the sheet positioning hole 400 is aligned with the positioning pin 53. In the third step 3 where the window plate 3 is positioned, the surface on the vehicle outside of the window plate 3 is fixed with the vacuum suction cup 54. In the seventh step, in the assembly intermediate body which has been removed by opening the core mold 51 and the cavity mold 52, as shown in FIG. 10, the unnecessary sheet 410 covering the window plate 3 is removed by making a cut with the trimming cutter 60. In this embodiment, since the injection gate 590 is positioned on the vehicle inside of the frame member 22, the trace of gate is not produced on the vehicle outside, so that the appearance is improved. Also, this embodiment is suitable for using the reaction injection molding (RIM) method. When the opening edge 4e of the sheet 4 is formed by making a cut in the sheet by using the trimming cutter 60, the thread of the woven cloth 4b is somewhat frayed from this portion in some cases. In this case, however, an liquid-form adhesive is applied to the trim edge along the lengthwise direction before or after the trimming process to make the thread of the woven cloth 4b stick to the resin sheet, thereby preventing the fraying.

Figure 11:
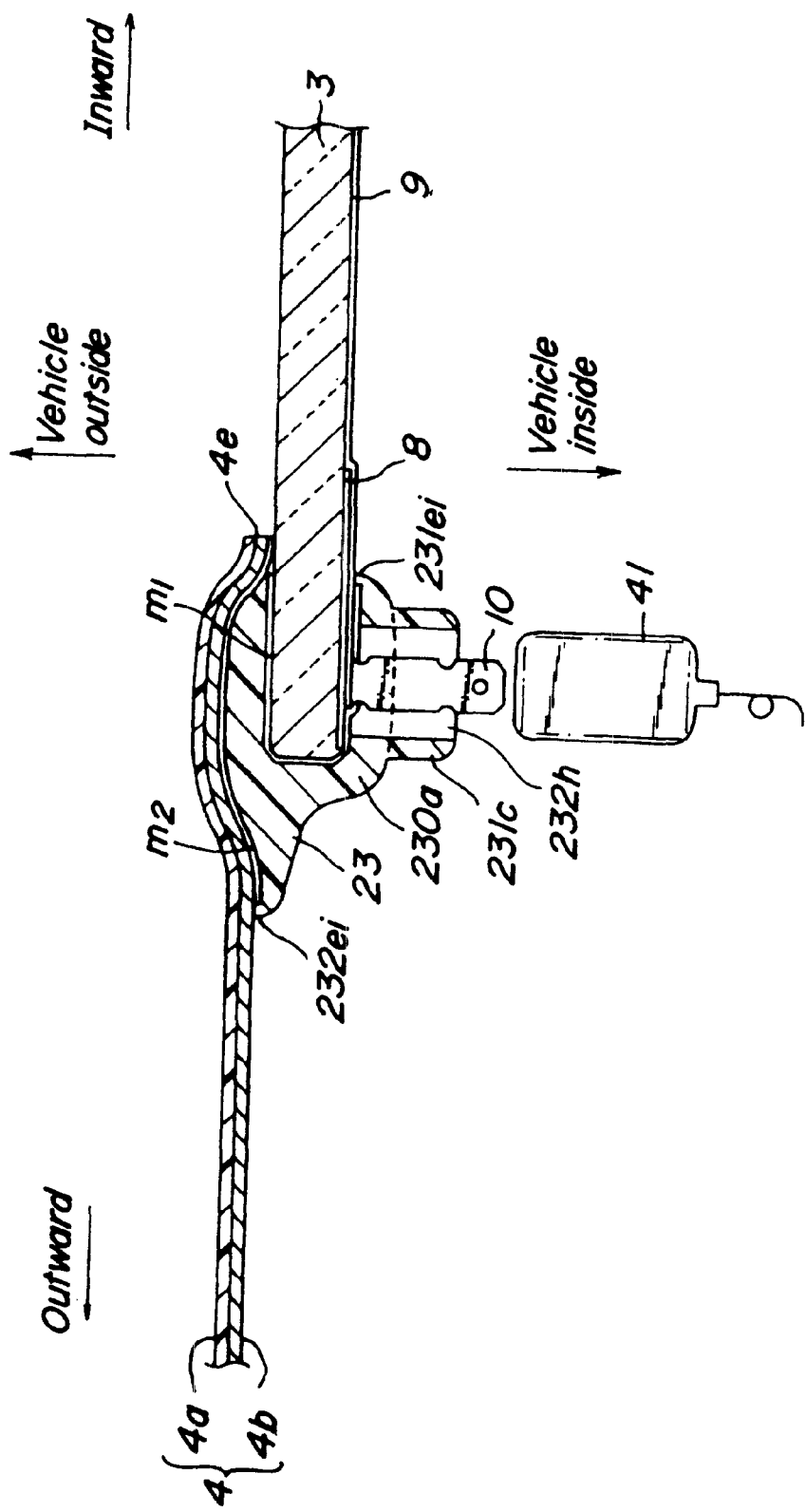
FIG. 11 is a sectional view taken along the line A—A of FIG. 2, showing the assembly of a fourth embodiment.

FIG. 11 shows a fourth embodiment of the assembly, which has a configuration in which the window plate 3 is disposed on the vehicle inside from the sheet 4. This cross-sectional shape shows the portion corresponding to A—A cross section in FIG. 2. The same reference numerals are applied to the same elements as those in FIG. 3.

For a frame member 23 of the fourth embodiment, the base of the hot wire print terminal 10 is buried by part of resin constituting a frame portion 230a, a connector cover portion 231C is provided around the hot wire print terminal 10 integrally with the frame member 23, and a space 232h for inserting a wiring connector 41 is formed around the terminal 10. In this embodiment, since the wiring connector 41 is inserted in the wiring connector insertion space 232h, the insulating property of the connector portion is increased. Also, since the terminal 10 is reinforced, the breakage of the terminal 10 is prevented when the top is folded in the use of the assembly.

FIG. 11 shows a fifth embodiment of the assembly, in which the vicinity of the opening edge of sheet is buried in a frame member 24 and integrated. This cross-sectional shape shows the portion corresponding to A—A cross section in FIG. 2. The same reference numerals are applied to the same elements as those in the above description. The opaque colored layer 8, hot wire print 9, and terminal 10 are omitted for explanation, but, needless to say, these elements may be provided.

The frame member 24 is formed of a synthetic resin, which is filled into the cavity of die in a state of being compressed and then solidified. Also, the frame member 24 is fixed to the vicinity of the outer peripheral edge 3e of the window plate 3 via the first fixing means $m_1$ in the cavity, and fixed to the vicinity of an opening edge 42e of a sheet 42 via the second fixing means $m_2$ in the cavity.

In this case, since the vicinity of the opening edge 42e of sheet is buried in the frame member 24 and integrated, the fixing force between the sheet 42 and the frame member 24 and the sealing property between the sheet 42 and the frame member 24 are increased as compared with the assembly of the first to fourth embodiments.

For the sheet, like the assembly of the first to fourth embodiments, the water-proof resin sheet 4a or the woven cloth 4b such as canvas, which is water-proofed and has a high tensile strength, can be used independently, but the sheet 42 of this embodiment is a sheet in which the resin sheet 4a is laminated on both surfaces of the woven cloth 4b. In particular, regarding the material of the resin sheet 4a, a material which is mutually soluble with the frame member 24 is preferable. If such a resin sheet is used, the second fixing means $m_2$ for fixing the frame member to the sheet is a welding portion between the frame member and the resin sheet. Even if the resin sheet and the woven cloth are not mutually soluble with the frame member 24, an adhesive layer may be formed in advance as the second fixing means $m_2$ at the contacting portion with the frame member 24.

Also, it is preferable that the sheet 42 and the frame member 24 be of the same or similar color. In this case, even if some resin leakage, burrs, etc. occur on the sheet 42, these defects are not conspicuous. Specifically, black containing carbon or black system color is especially preferable from the viewpoint of quality such as weather resistance.

Also, in this embodiment, as third fixing means $m_3$ for supplementarily fixing the frame member 24 to the sheet 4, part of the synthetic resin forming the frame member 24 flows into a hole 422 formed in the vicinity of the opening edge 42e of the sheet 42, and the resins on both sides are integrated. In this case, the fixing portion between the frame member 24 and the sheet 42 is mechanically fixed by the integrated resin and reinforced, so that the fixing of the frame member 24 to the sheet 42 is made more stable.

Figure 12:
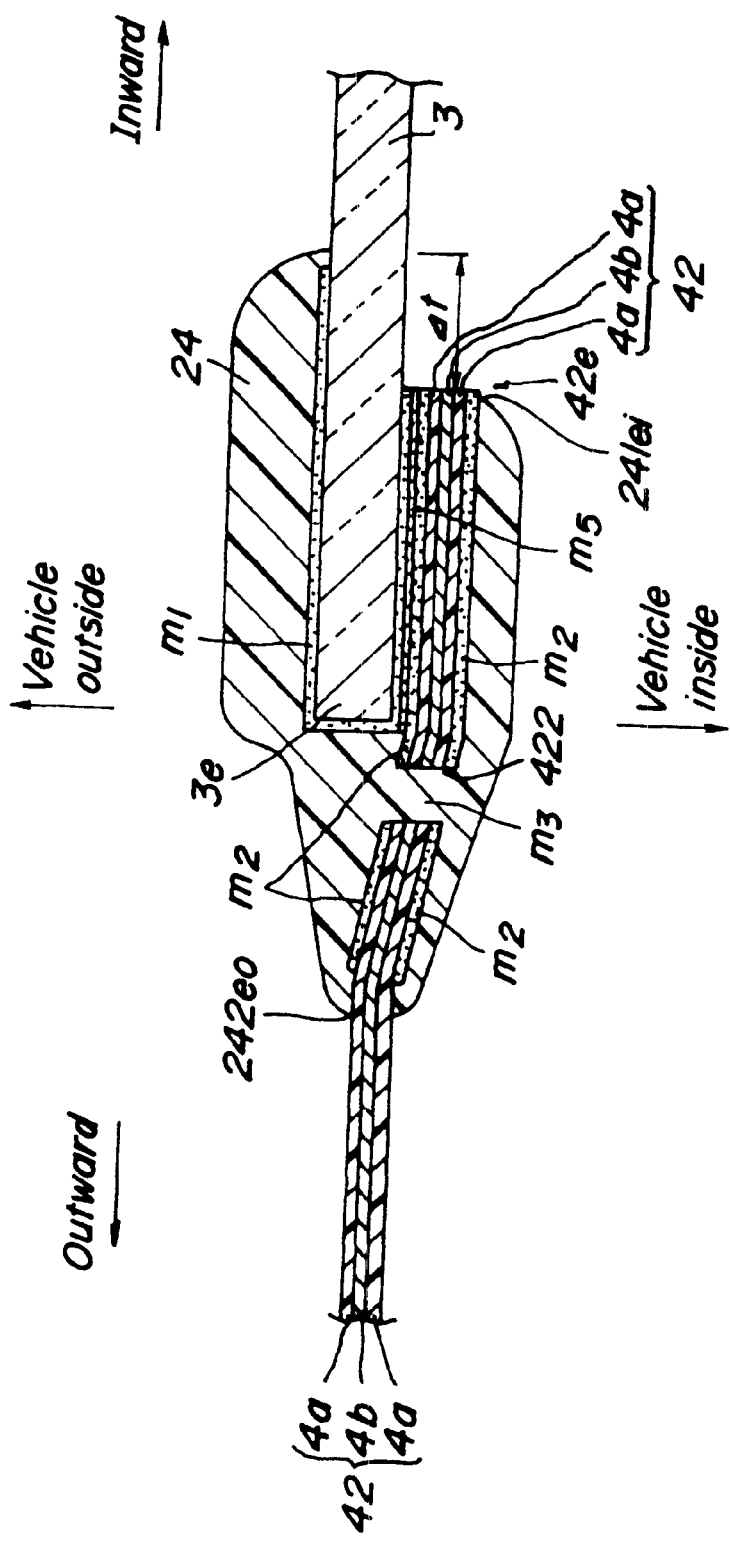
FIG. 12 is a sectional view taken along the line A—A of FIG. 2, showing the assembly of a fifth embodiment.
Figure 13:
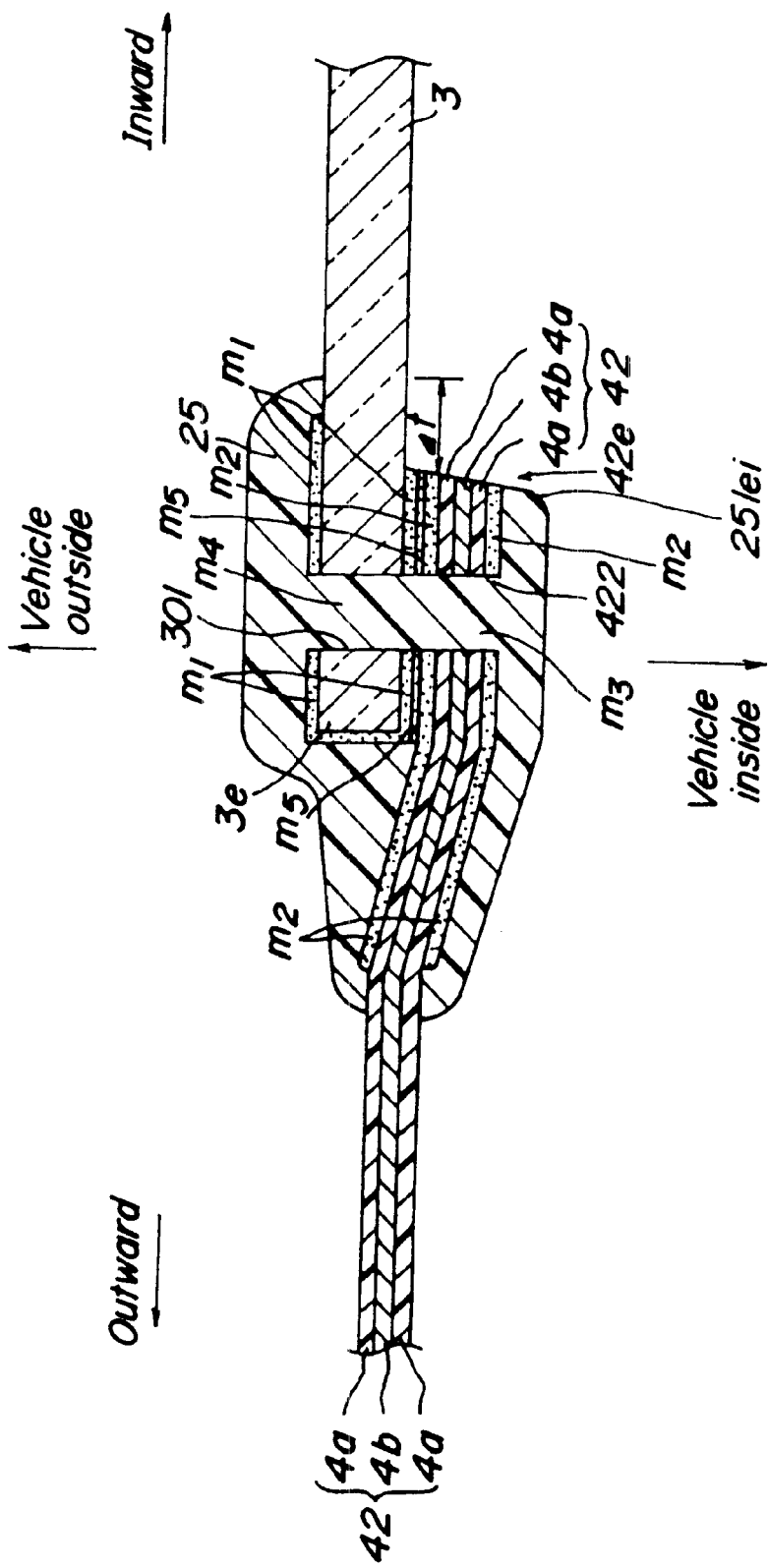
FIG. 13 is a sectional view taken along the line A—A of FIG. 2, showing the assembly of a sixth embodiment.

FIG. 13 shows a sixth embodiment of the assembly, in which fourth fixing means $m_4$ for supplementarily fixing the window plate to the frame member is provided in addition to the assembly of the fifth embodiment. This cross-sectional shape shows the portion corresponding to A—A cross section in FIG. 2. The same reference numerals are applied to the same elements as those shown in FIG. 12. The opaque colored layer 8, hot wire print 9, and terminal 10 are omitted for explanation, but, needless to say, these elements may be provided.

In the sixth embodiment, comparing with the assembly of the fifth embodiment, as the fourth fixing means $m_4$ for supplementarily fixing a frame member 25 to the window plate 3, part of the synthetic resin forming the frame member 25 flows into a hole 301 formed in the vicinity of the outer peripheral edge 3e of the window plate. In this case, the fixing portion between the frame member 25 and the window plate 3 can be reinforced by the frame member 25 itself, so that the fixing of the frame member 25 to the window plate 3 is made more stable. In this embodiment, the window plate 3 is preferably made of a synthetic resin such as a plastic material because the hole 301 must be formed in the vicinity of the outer peripheral edge 3e of the window plate.

Regarding the assembly shown in FIGS. 12 and 13, a portion between the first fixing means $m_1$ and the second fixing means $m_2$ is fixed by fifth fixing means $m_5$. In this case, since the window plate 3 can be fixed to the sheet 42 without interposing a synthetic resin between the first fixing means $m_1$ and the second fixing means $m_2$, the thickness of the frame member 25 is decreased, so that the lightweight of the convertible top assembly can be achieved. In FIGS. 12 and 13 (and later-described FIG. 17), the thicknesses of the sheet and fixing means are shown exaggeratingly for ease of understanding.

Figure 14:
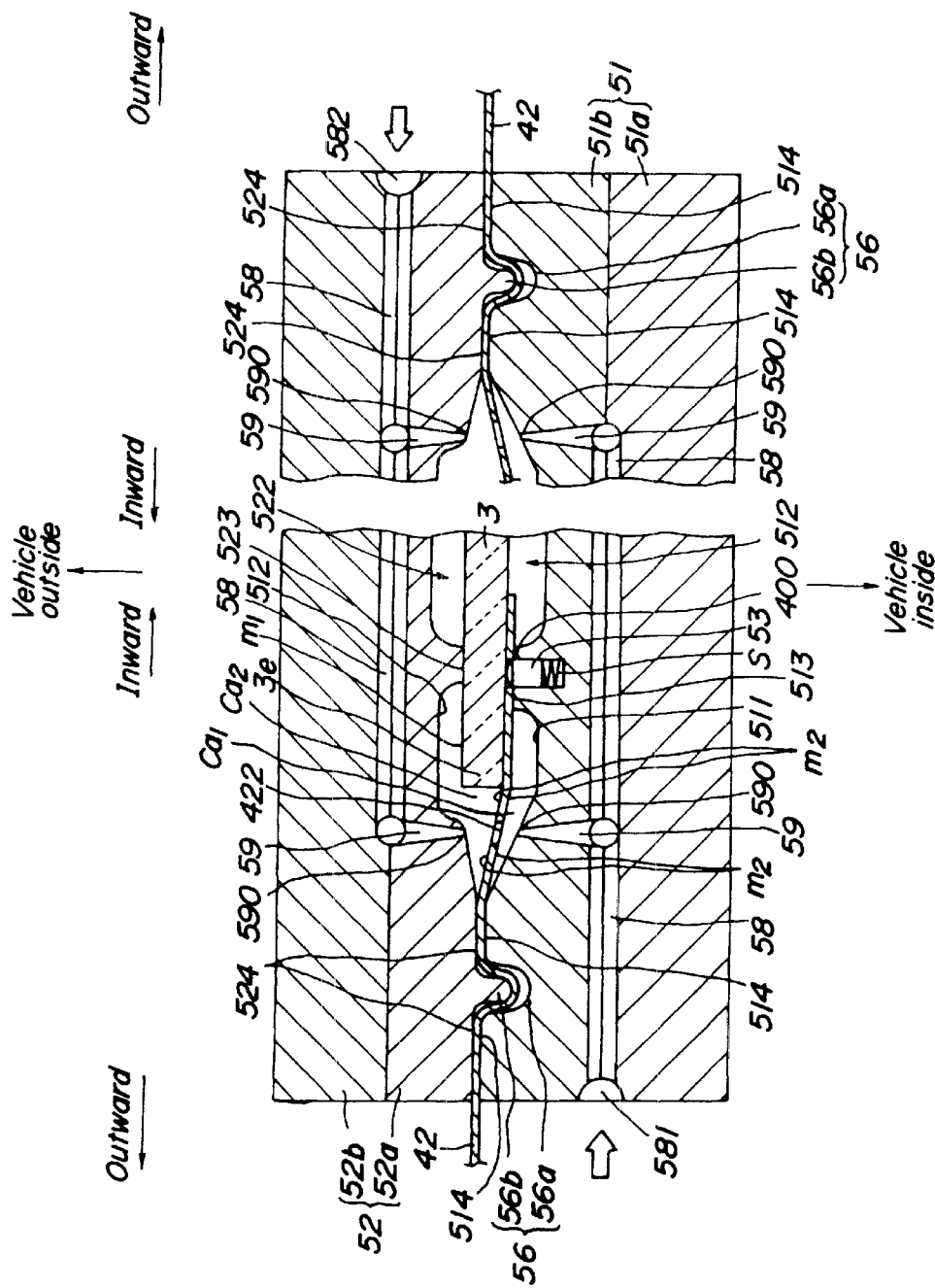
FIG. 14 is a sectional view showing a state in which a core mold and a cavity mold are closed in a first embodiment of an apparatus for forming the assembly of a fifth embodiment.

FIG. 14 shows a first embodiment of the apparatus for manufacturing the assembly shown in FIG. 12, being a sectional view showing a forming portion of an injection die. In this figure, the same reference numerals are applied to the same elements as those shown in FIGS. 12.

FIG. 14 is a sectional view of an injection die in a state in which the core mold 51 and the cavity mold 52 are clamped. The core mold 51 has the mold face 511 for forming the cavity Ca on the mating face (division face) with the cavity mold 52, and has the concave 512 for preventing the contact with the window plate 3. Also, the cavity mold 52 has the mold face 521 for forming the cavity Ca on the mating face (division face) with the core mold 51, and has the concave 522 for preventing the contact with the window plate 3. However, the broken portion at the center right in the figure is a portion which is adjacent to the outer peripheral edge of cavity forming the frame member 24 at the outer peripheral edge of the window plate 3 on the side opposite to the outer peripheral edge 3e of the window plate 3 at center left.

For this apparatus, when the die is closed, the cavity Ca of a predetermined shape extending in the lengthwise direction along the outer peripheral edge 3e of window plate is formed on the division face of die, and part of this cavity Ca is formed by the window plate 3. The core mold 51 adjacent to the outer peripheral edge of the cavity Ca and the holding portions 514 and 524 of the cavity mold 52 hold the sheet 42 and seal the division face in the die in a state in which the sheet 42 is compressed, and the core mold 51 adjacent to the inner peripheral edge of the cavity Ca and the holding portions 513 and 523 of the cavity mold 52 hold the sheet 42 and the window plate 3 and seal the division face in the die in a state in which the sheet 42 is compressed, so that the cavity Ca is divided into two pieces, a vehicle inside cavity Ca1 and a vehicle outside cavity Ca2, along the extending direction of the peripheral edge of the window plate 3 by the sheet 42.

The core mold 51 is made up of two runner plates 51a and 51b, and the runner 58 communicating with the injection gate 590 is formed on the mating face between the runner plates 51a and 51b. Likewise, the cavity mold 52 is made up of two runner plates 52a and 52b, and the runner 58 communicating with the injection gate 590 is formed on the mating face between the runner plates 52a and 52b. That is, on this apparatus, both of the core mold 51 and the cavity mold 52 are provided with the injection gate 590 for supplying a liquid-form synthetic resin or a liquid-form resin raw material to the cavity Ca. As shown in the figure, the injection gate 590 provided in each of the core mold 51 and the cavity mold 52 may be formed at one location in the cavity Ca. However, it is preferable that, considering the case where a liquid-form synthetic resin which is less flowable due to high viscosity is used, a plurality of resin flow paths (59, 590) be additionally provided at intervals in the lengthwise direction along the lengthwise direction of the cavity Ca.

A liquid-form synthetic resin or a liquid-form resin raw material is supplied through a first resin supply port 581 formed in the core mold 51 and a second resin supply port 582 formed in the cavity mold 52 and injected and filled into the cavity Ca. At this time, it is preferable to regulate the injection amount from each port so that the sheet 42 in the cavity Ca does not shift to one mold face of the core mold or the cavity mold. Specifically, the injection amount corresponding to the volume ratio (area ratio on the transverse face) of the cavities Ca1 and Ca2 divided by the sheet 42 is injected at overlapping timing. Thereby, the pressures applied to both faces of the sheet 42 is balanced, and the shift of the sheet 42 to either of the core mold 51 or the cavity mold 52 can be prevented. Also, the injection amount corresponding to the volume ratio of the cavities Ca1 and Ca2 and the injection timing can be determined by appropriately controlling the size, length, etc. of the runner 58. It is preferable to make CAE (computer aided engineering) analysis and the like in advance.

Figure 15:
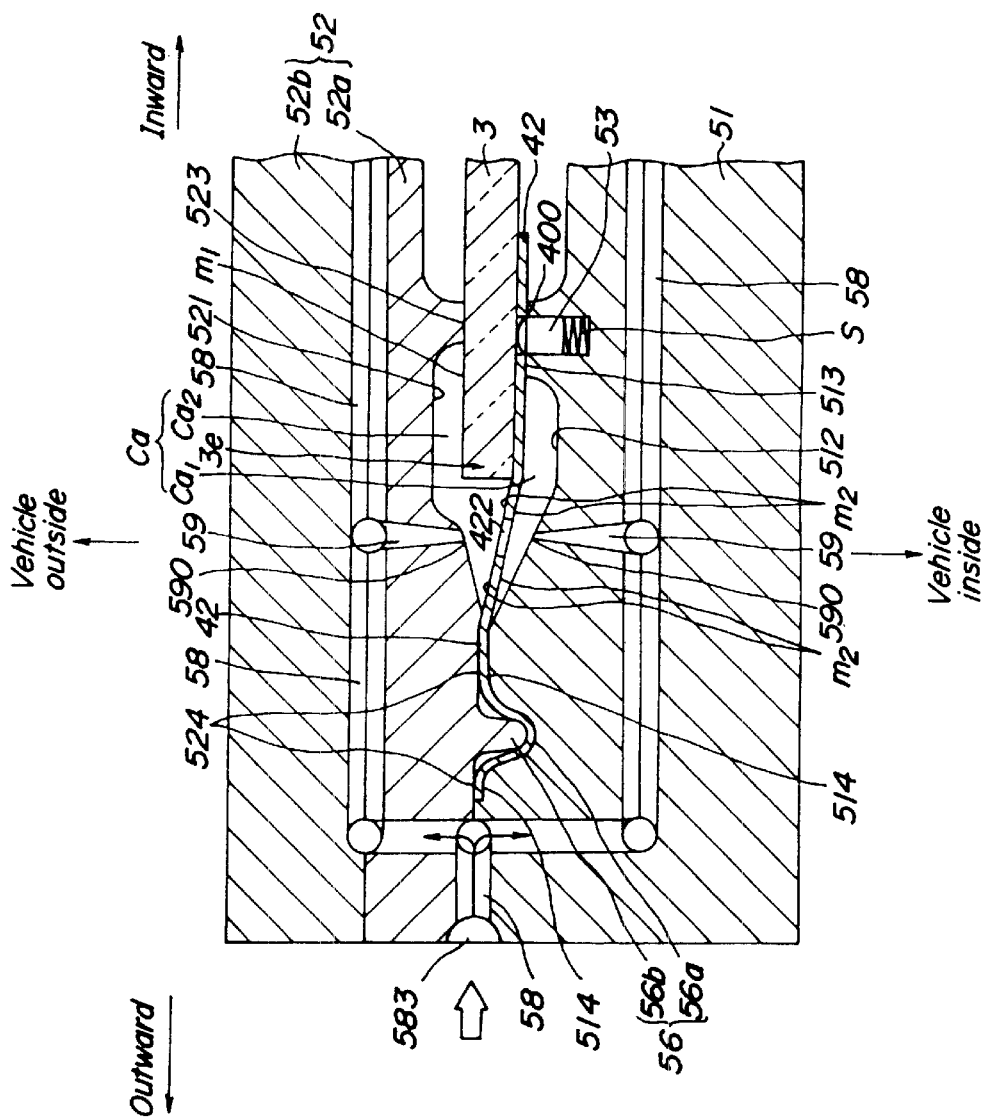
FIG. 15 is a sectional view showing a state in which a core mold and a cavity mold are closed in a second embodiment of an apparatus for forming the assembly of the fifth embodiment.

FIG. 15 shows a second embodiment of the apparatus for manufacturing the assembly shown in FIG. 12, being a sectional view showing a forming portion of an injection die. In this figure, the same reference numerals are applied to the same elements as those shown in FIGS. 14.

This figure is a sectional view of an injection die in the state of mold clamping. The basic construction is the same as that of apparatus shown in FIG. 14, but the core mold 51 is configured singly. In this embodiment, the runner having a third resin supply port 583 is formed on the mating face (division face) of the core mold 51 and the cavity mold 52, and the runner 58 of the core mold 51 and the runner 58 of the cavity mold 52 are connected to each other integrally. Thereby, although on the apparatus shown in FIG. 14, two injection molding machines must be connected to the first resin supply port 581 and the second resin supply port 582, in this embodiment, the injection nozzle of one injection molding machine is connected to the resin supply port 583 of the core mold 51, by which a liquid-form synthetic resin or a liquid-form resin raw material supplied to the resin supply port 583 of the core mold 51 can be injected and filled into the cavities Ca1 and Ca2 through the injection gates 590 provided in both of the core mold 51 and the cavity mold 52. As shown in the figure, the injection gate 590 provided in each of the core mold 51 and the cavity mold 52 may be provided at one location in the cavity Ca. However, it is preferable that, considering the case where a liquid-form synthetic resin which is less flowable due to high viscosity is used, a plurality of resin flow paths (59, 590) be provided at intervals along the lengthwise direction of the cavity Ca.

It is preferable to regulate the injection amount to the cavities Ca1 and Ca2 so that the sheet 42 in the cavity Ca does not shift to one mold face of the core mold or the cavity mold. Specifically, the injection amount corresponding to the volume ratio (area ratio) of the cavities Ca1 and Ca2 divided by the sheet 42 is injected at overlapping timing. In this case, the pressures applied to both faces of the sheet 42 is balanced, and the shift of the sheet 42 to either of the core mold 51 or the cavity mold 52 can be prevented. Also, the injection amount corresponding to the volume ratio of the cavities Ca1 and Ca2 and the injection timing can be determined by appropriately controlling the size, length, etc. of the runner 58. It is preferable to make CAE analysis and the like in advance.

On this apparatus, the external size of the sheet 42 is formed, in advance, into a size slightly larger than the outer peripheral edge shape of the window plate 3 (for example, a size corresponding to only the rear window portion of the vehicle). After the frame member 24 is formed, the sheet 42 is joined to other sheet materials constituting the rear side portion and the roof portion of the vehicle by stitching, by which the convertible top assembly is completed.

Figure 16:
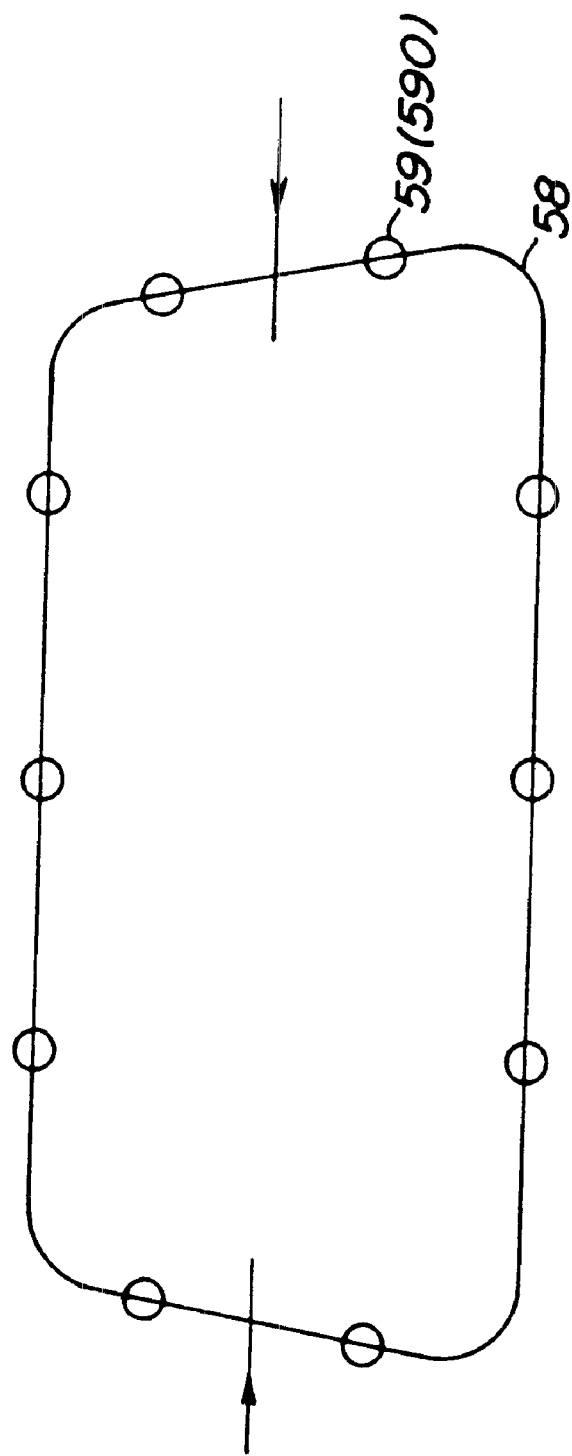
FIG. 16 is a sectional view showing an arrangement of injection gates formed along a runner provided in a core mold or a cavity mold in the first or second embodiment of an apparatus for forming the assembly of the fifth embodiment.

FIG. 16 relates to the apparatus shown in FIGS. 14 and 15, showing the arrangement of the runner 58 and the sprues 59 (injection gates 590) provided on the mold face of the core mold 51 or the cavity mold 52. A plurality of injection gate 590 (sprues 59) are formed on the runner 58 formed annularly along the shape of the outer peripheral edge 3e of the window plate 3 on the mold face of the core mold 51 or the cavity mold 52. In order to prevent the shift of the sheet 42 in one direction during the injection of a synthetic resin or resin raw material, it is preferable that the injection gate 590 of the core mold 51 and the injection gate 590 of the cavity mold 52 be provided so as to face each other. By this configuration, the pressure applied to the sheet 42 is made equal, and the shift of the sheet 42 can be prevented.

Regarding the apparatus shown in FIGS. 14 and 15, the pulling means using the aforesaid principle of an embroidery ring is provided at the holding portion 514 of the core mold 51 and the holding portion 524 of the cavity mold 52. The pulling means 56 is made up of an annular concave portion 56a and convex portion 56b along the outer peripheral edge shape of the window plate 3. By the pulling means of such construction, at the same time when the core mold 51 and the cavity mold 52 are clamped, the looseness produced when the sheet 42 is positioned can be removed.

The manufacturing method for the assembly, entailing the formation of the frame member 24, will be described in the sequence of process with reference to FIGS. 14 and 15.

First, as a first step, the sheet 42 is placed on the core mold 51 with the die being open and the positioning is performed. Specifically, the positioning is performed by aligning the positioning hole 400 formed in advance in the sheet 42 with the positioning pin 53 as shown in the figure. The material of the positioning pin 53 is preferably a material which is less prone to cause scratches, cracks, and other damages on the window plate 3 and is softer and more wear-resistant than the window plate 3 (for example, polyacetal resin). Also, the shape of the positioning pin 53 should preferably be such that the tip end of pin is of a tapered circular shape. Also, if an embossing pattern with many minute irregularities is formed on the surface of the resin sheet 4a of the sheet 42, the surface of the window plate 3 comes into contact with the convex portions of embossing and is supported by them, so that the buffering operation is further increased. In addition, at the holding portion 513 on the inner periphery side, the sheet 42 is compressed slightly and acts as a seal material which allows a gas to pass through but prevents a liquid from passing through. Therefore, the liquid-form synthetic resin injected and filled into the cavities Ca1 and Ca2 is prevented from leaking from between the window plate 3 and the sheet 42, and also the air in the cavities Ca1 and Ca2 is discharged effectively. As the resin sheet, for example, a soft PVC resin sheet can be used.

In a second step, the window plate 3 is placed and positioned. As this positioning means, for example, the positioning arm 55 shown in FIG. 4 is used. However, in the vicinity of the outer peripheral edge 3e of the window plate 3, where the frame member 24 is formed, the first fixing means $m_1$ is formed in advance. As the first fixing means $m_1$, an adhesive layer is used. However, when the window plate 3 is made of a synthetic resin, in place of the first fixing means $m_1$ of an adhesive layer or in addition to this, mechanical means can be used in which many through holes or undercut-shape notches are formed along the frame member 24 in the vicinity of the outer peripheral edge 3e of window plate, and a liquid resin is fixed to the through holes or notches. Also, the adhesive layer, which is the first fixing means $m_1$, may be an adhesive layer activated by heat, like the assembly of the first embodiment.

It is preferable that the window plate 3 be heated wholly to a temperature above normal temperature (about 60 to 130 C in the case of inorganic glass pane) in advance and the outer peripheral edge shape be thermally expanded as compared with the shape at normal temperature. Thereby, the temperature difference between the window plate 3 and the injected resin is decreased, so that the degree of thermal shock applied to the window plate 3 is decreased, which contributes to the restraint on cracks when the window plate 3 is made of glass. Besides, the window plate 3 contracts with the contraction after the formation of the frame member 24, so that the relative contraction of the frame member is less, by which the occurrence of an internal stress by which the frame member 24 tightens the window plate 3 from the outside can be reduced. Thereby, the window plate 3 can be prevented from being deformed in an undesirable direction by a compressive stress, or the frame member 24 can be prevented from being cracked by a residual tensile stress.

In a third step, the core mold 51 and the cavity mold 52 are put together and clamped. At this time, the sheet 42 arranged at a predetermined position between the core mold 51 and the cavity mold 52 is positioned so that the cavity Ca formed by the mold face 511 of the core mold 51, the mold face 521 of the cavity mold 52, and the window plate 3 is divided into two pieces, the vehicle inside cavity Ca1 and the vehicle outside cavity Ca2, along the extending direction of the window plate 3, and is separated from both of the mold faces 511 and 521.

In a fourth step, injection molding is performed by injecting a liquid-form synthetic resin melted by heating into the cavities Ca1 and Ca2 divided along the extending direction of the window plate 3 from the injection gates 590 provided in both of the core mold 51 and the cavity mold 52. However, when a plurality of injection gates 590 are provided, it is preferable that a liquid-form synthetic resin be injected from each injection gate 590 at overlapping timing. In this case, the inward compressive forces in the face direction of the window plate 3 acting by the pressure of the injected liquid-form synthetic resin can be canceled each other. Thereby, as described above, the compressive forces in the face direction of the window plate 3 are canceled each other by the pressure of the injected liquid-form synthetic resin, so that the positional shift in the face direction of the window plate 3 can be prevented.

The liquid-form synthetic resin of this embodiment is a thermoplastic resin which is made liquid-form by heating. Specifically, general-purpose plastics such as PVC resin, ABS resin, PP (polypropylene) resin, and PS (polystyrene) resin, the aforesaid engineering plastics, or the polymer alloy of these resins, and further a resin in which a reinforcing material is mixed are used. These resins are softened and made flowable by heating and solidified by cooling. At this time, if the resin is injected from the slightly outside position from the outer peripheral edge 3e of the window plate 3, the resin does not collide directly with the face of the window plate 3 which is in a state of cantilever, so that no bending moment is produced on the window plate 3. Therefore, when the material of the window plate 3 is inorganic glass, the breakage and crack are prevented, and when the material of the window plate 3 is synthetic resin, the deformation is prevented.

Since the resin sheet 4a of the sheet 4 is mutually soluble with the synthetic resin forming the frame member 24, the surface of the resin sheet 4a is somewhat melted by the conduction heat of the injected liquid-form synthetic resin, melts together with the synthetic resin forming the frame member 24, and provides strong welding by the pressure of the injected resin. In this case, the second fixing means $m_2$ is the welding portion of the frame member 24 and the resin sheet 4a. At this time, when a soft PVC resin is used as a resin forming the frame member 24, it is preferable that the injected liquid-form synthetic resin be heated to a temperature of about 200 to 220 C and melted.

However, even in the case where the resin sheet 4a is mutually soluble with the synthetic resin for the frame member 24, if the fixing force is insufficient in fixing between the frame member 24 and the sheet 42, it is preferable that an adhesive layer be also be used. In particular, if the adhesive is an adhesive activated by heat, the adhesive layer between the frame member 24 and the sheet 42 is activated by the heating operation due to the liquid-form synthetic resin, so that the frame member 24 and the sheet 42 can be fixed to each other strongly.

In a fourth step, at least two liquid-form resin raw materials forming a synthetic resin by reaction may be supplied to the cavities Ca1 and Ca2 divided along the extending direction of the window plate 3 from the injection gates 590 provided in both of the core mold 51 and the cavity mold 52. As such liquid-form resin raw materials, for example, a mixture of polyol and isocyanate, which forms polyurethane by chemical reaction, can be used. In this case, the second fixing means $m_2$ is an adhesive layer formed on the sheet 42 or a thermally activated adhesive layer.

The colors of the sheet 42 and the frame member 24 are preferably the same or of the same system for the purpose such that even if some resin leakage, burrs, etc. occur on the sheet 42, these defects are not conspicuous. Specifically, black containing carbon or black system color is especially preferable from the viewpoint of quality such as weather resistance.

In a fifth step, an assembly intermediate body in which the window plate 3 and the sheet 42 are integrated by the frame member 24 is removed from the die.

Figure 17:
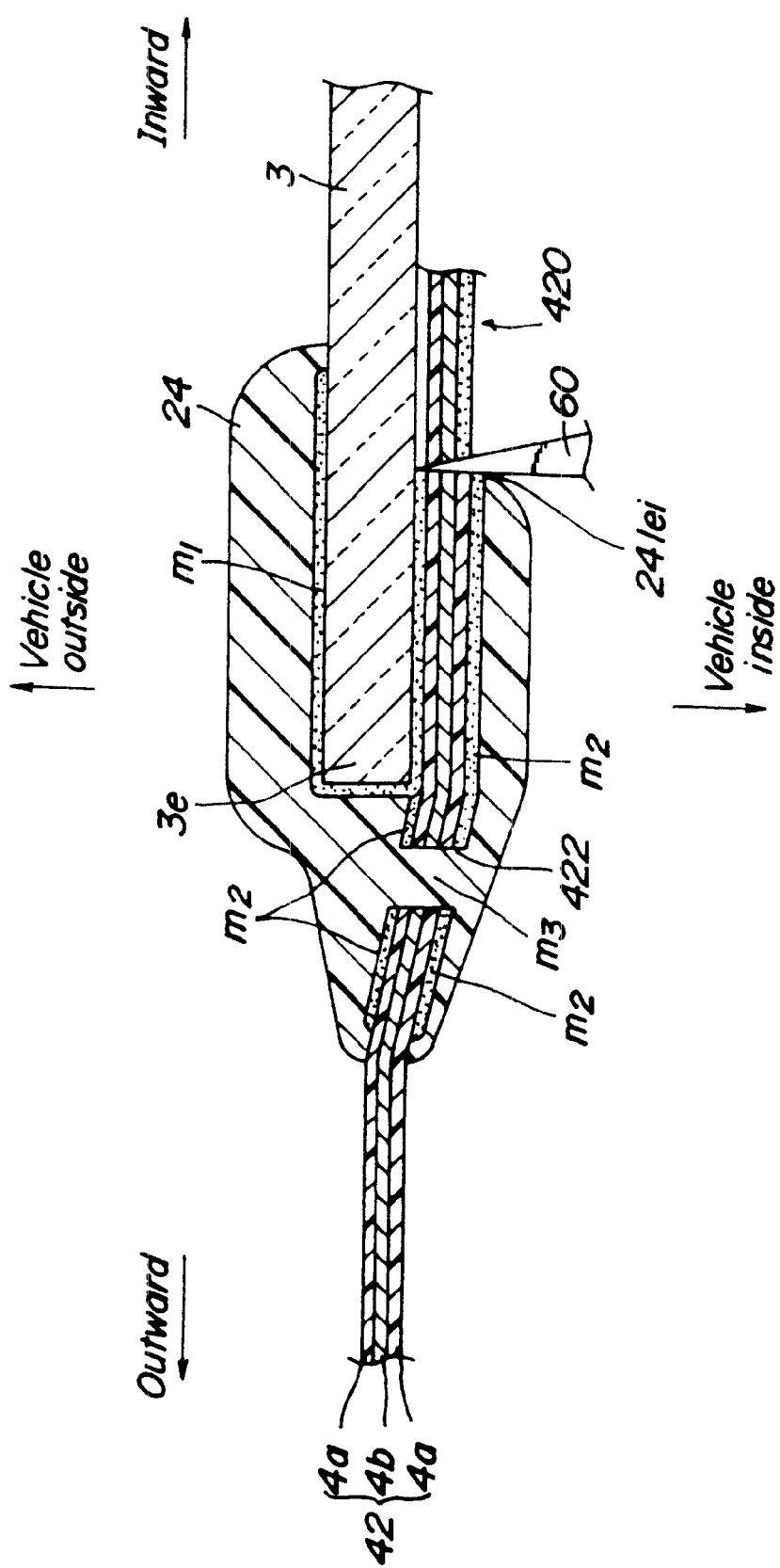
FIG. 17 is a view for illustrating a process in which a sheet material is trimmed to complete the assembly of the fifth embodiment.

FIG. 17 is a view corresponding to A—A cross section in FIG. 2 for illustrating a process in which an unnecessary portion of the sheet 42 of assembly intermediate body removed from the die is trimmed on the apparatus shown in FIG. 14 or FIG. 15.

In a sixth step, the mold is opened, the assembly intermediate body having the frame member 24 is taken out, and an unnecessary sheet portion covering the window plate 3 is trimmed. Specifically, as shown in FIG. 17, a cut is made on the sheet with the trimming cutter 60 such as a knife, and the sheet 42 which is made a convertible top when a product is made and a sheet 420 removed when a product is made are separated from each other.

Although the window plate 3 and the sheet 42 are fixed to each other by the first fixing means $m_1$ in this figure, needles to say, any construction in which the first fixing means $m_1$ can be fixed to the sheet 42 may be used. Also, to form the sheet 42, a separation line is formed on the sheet 42 along an inner peripheral edge 241ei of the frame member 24, and the sheet 420 at a portion which is not fixed to the frame member 24 inward from the inner peripheral edge 241ei of the frame member 24 may be removed.

Figure 18:
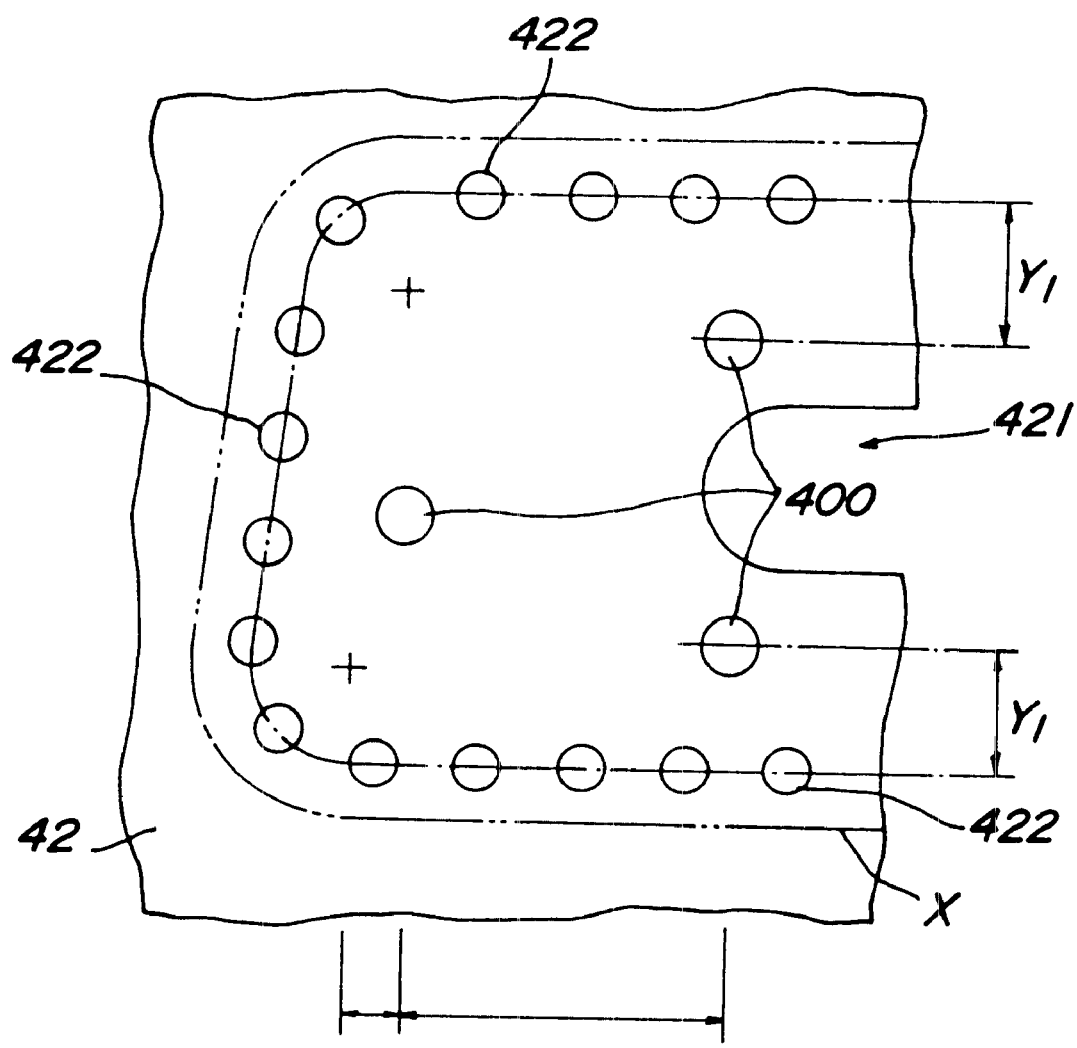
FIG. 18 is a front view showing a sheet material used for manufacturing the assembly of the fifth embodiment.

FIG. 18 is a front view of a sheet of the preceding stage arranged in the apparatus shown in FIG. 14 or FIG. 15. The two-dot chain line X in the figure indicates the position of an outer peripheral edge 242eo (242ei) of the frame member 24. The holes 422 constituting the third fixing means have a predetermined distance $Y_1$ from the positioning holes 400 through which the positioning pin 53 of the core mold 51 passes, and are formed along the two-dot chain line X. A liquid-form synthetic resin or a liquid-form resin raw material supplied into the cavity Ca flows into the cavities Ca1 and Ca2 through the plural holes 422. Reference numeral 421 denotes a suction cup relief hole for allowing the vacuum suction cup 54 (see FIG. 4) for fixing the window plate 3 to pass through.

The above is a description of the apparatus and method for manufacturing the assembly of the fifth embodiment. The manufacturing apparatus for an assembly entailing the formation of a frame member 25 is the same as that shown in FIGS. 14 to 16 except that the shapes of the mold half and cavity are different. The manufacturing method is also the same as that used on the apparatus shown in FIGS. 14 to 16.

Figure 19:
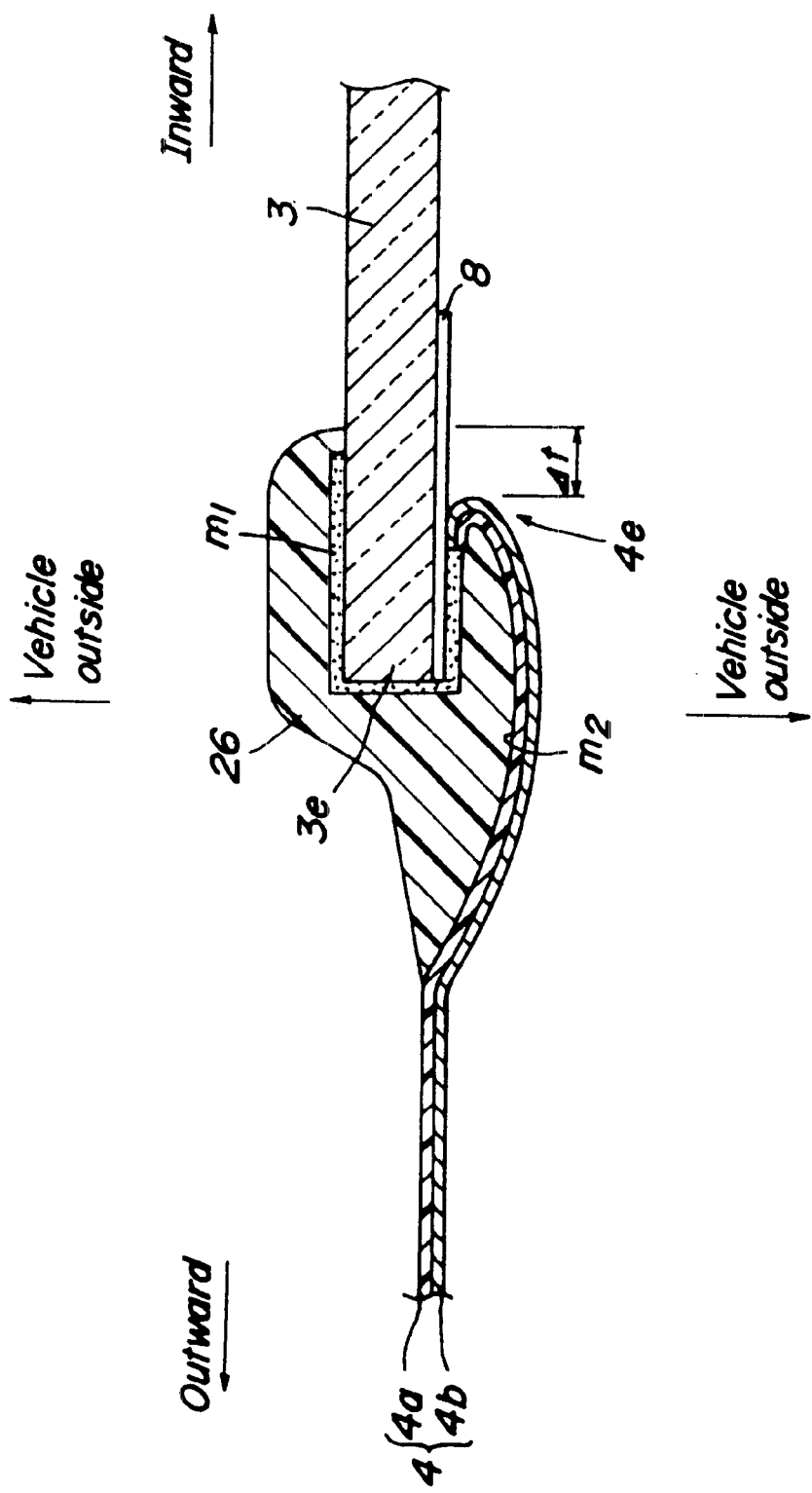
FIG. 19 is a sectional view taken along the line A—A of FIG. 2, showing the assembly of a seventh embodiment.

FIG. 19 shows an assembly of a seventh embodiment, in which the vicinity of the opening edge of sheet is fixed to a frame member 26 which is integral with the window plate 3 outside the cavity by the second fixing means $m_2$. This cross-sectional shape shows the portion corresponding to A—A cross section in FIG. 2, and the same reference numerals are applied to the same elements as those in the above description. The hot wire print 9 and terminal 10 are omitted for explanation, but, needless to say, these elements may be provided.

The frame member 26 is formed of a synthetic resin, which is filled into the cavity of die in a state of being compressed and then solidified. Also, the frame member 26 is fixed to the vicinity of the outer peripheral edge 3e of the window plate via the first fixing means m in the cavity, and fixed to the vicinity of the opening edge 4e of the sheet via the second fixing means $m_2$ outside the cavity over the contact portion with the frame member 26. The frame member 26 is covered by the sheet 4 so as to be invisible from the vehicle inside.

In this case, even if the frame member 26 is fixed to the vicinity of an opening edge 42e of a sheet 42 via the second fixing means $m_2$ outside the cavity, it is fixed over the contact portion with the frame member 26. Therefore, the effect of fixing the sheet 4 to the frame member 26 is greater than the effect produced when the sheet 4 is fixed to the surface of the frame member 26 at a part of the contact portion with the frame member 26. Also, this method is effective when the sheet 4 is difficult to form integrally with the frame member 26.

Figure 20:
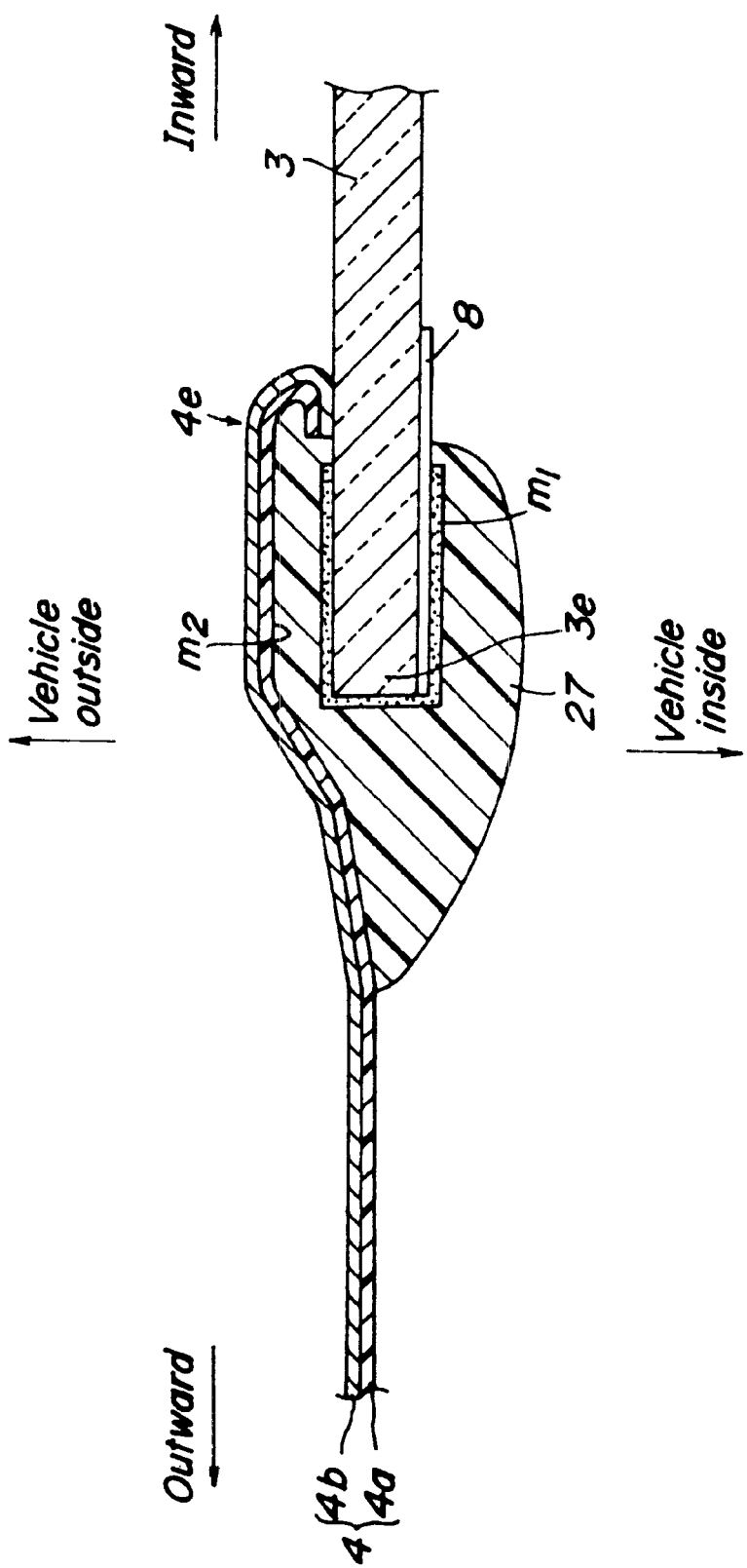
FIG. 20 is a sectional view taken along the line A—A of FIG. 2, showing the assembly of an eighth embodiment.

FIG. 20 shows an assembly of an eighth embodiment, which is the same as the assembly of the seventh embodiment except that a frame member 27 is covered by the sheet 4 so as to be invisible from the vehicle outside. This cross-sectional shape shows the portion corresponding to A—A cross section in FIG. 2, and the same reference numerals are applied to the same elements as those in the above description. The hot wire print 9 and terminal 10 are omitted for explanation, but, needless to say, these elements may be provided.

The frame member 27 is formed of a synthetic resin, which is filled into the cavity of die in a state of being compressed and then solidified. Also, the frame member 26 is fixed to the vicinity of the outer peripheral edge 3e of the window plate via the first fixing means $m_1$ in the cavity, and fixed to the vicinity of the opening edge 4e of the sheet via the second fixing means $m_2$ outside the cavity over the contact portion with the frame member 27. The frame member 27 is covered by the sheet 4 so as to be invisible from the vehicle outside.

In this case, since the frame member 27 is not exposed to the vehicle outside because of being covered by the sheet 4, as a synthetic resin for the frame member 27, a special weather resistance need not be considered because the sunlight is inhibited, and a material considering the scratch resistance need not be used. Therefore, the frame member 27 made of polyurethane resin by reaction injection molding (RIM) may be used though polyurethane resin is inferior to PVC resin in terms of weather resistance.

For the sheet of the seventh and eighth embodiments, like the assembly of the first to fourth embodiments, the waterproof resin sheet or film resin sheet 4a or the woven cloth 4b such as canvas, which is waterproofed and has a high tensile strength, can be used independently, but the sheet 4 of this embodiment is a sheet in which the resin sheet 4a and the woven cloth 4b are laminated. For the sheet, like the assembly of the fifth and sixth embodiment, the sheet 42 in which the resin sheet 4a is laminated on both surfaces of the woven cloth 4b may be used. However, regarding the material of the resin sheet 4a, a material which is mutually soluble with the frame member 26 (27) is preferable. If such a resin sheet is used, the second fixing means $m_2$ for fixing the frame member to the sheet is a welding portion between the frame member and the resin sheet. Even if the resin sheet and the woven cloth are not mutually soluble with the frame member 26 (27), an adhesive layer may be formed in advance as the second fixing means $m_2$ at the contacting portion with the frame member 26 (27).

Figure 21:
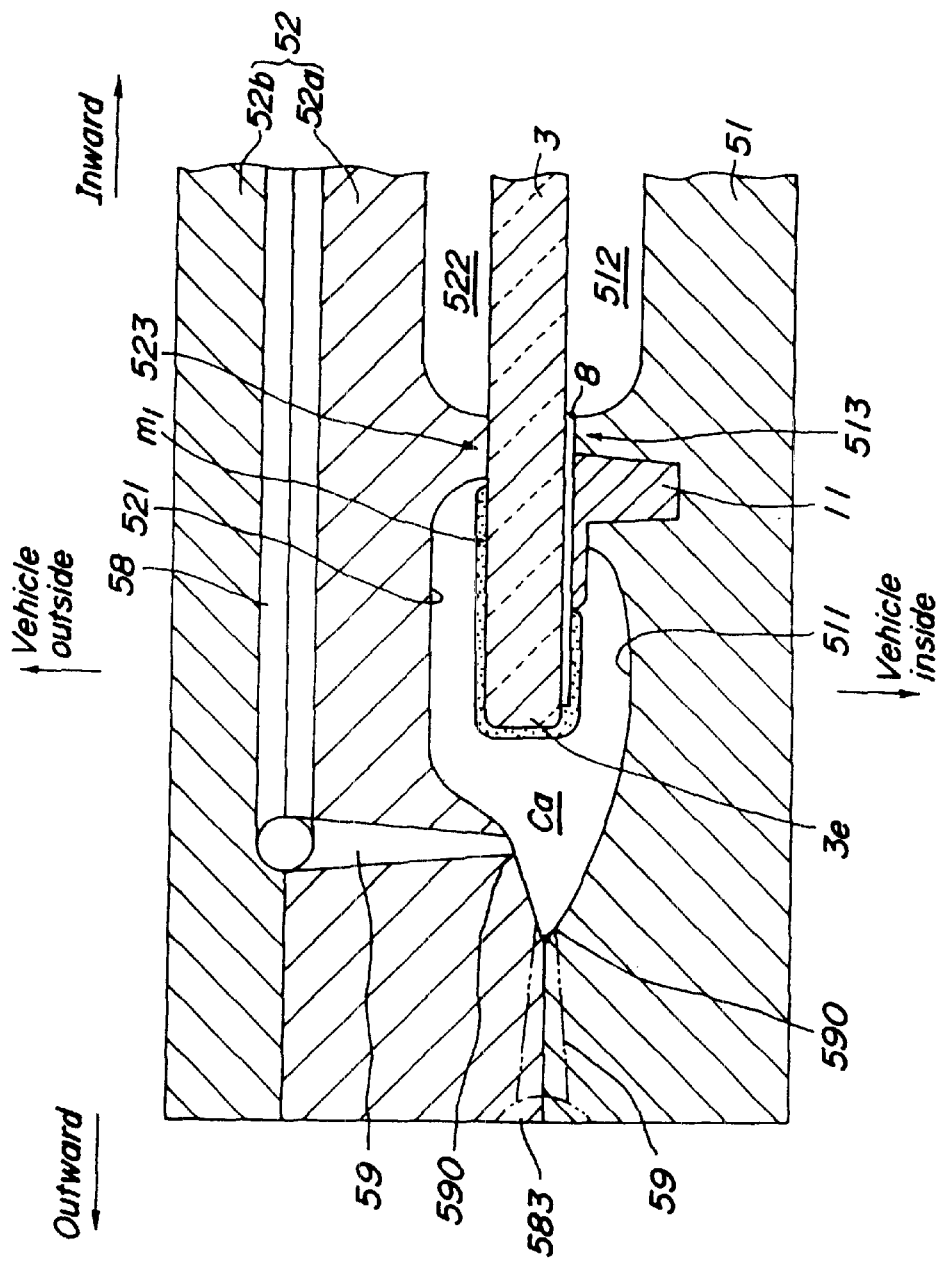
FIG. 21 is a sectional view showing a state in which a core mold and a cavity mold are closed in one embodiment of an apparatus for forming the assembly of the seventh embodiment.

FIG. 21 shows one embodiment of the apparatus for manufacturing the assembly shown in FIG. 19, being a sectional view showing a forming portion of an injection die. In this figure, the same reference numerals are applied to the same elements as those shown in FIGS. 19.

In this apparatus, when the die is closed, the cavity Ca of a predetermined shape extending in the lengthwise direction along the outer peripheral edge 3e of the window plate is formed on the division face in the die by the mold face 511 of the core mold 51 and the mold face 521 of the cavity mold 52, the vicinity of the outer peripheral edge 3e of the window plate, and a gap forming mold 11. That is, the cavity Ca is formed by holding the window plate 3 by the holding portions 513 and 523 of the core mold 51 and the cavity mold 52 which are adjacent to the inner peripheral edge of the cavity Ca.

The core mold 51 is configured singly, and at the portion contacting with the face of the window plate 3, the gap forming mold 11 is detachably installed to the core mold 51 as gap forming means which, at the same time when the frame member 26 and the window plate 3 are integrally formed, forms a gap for enfolding the vicinity of the opening edge 4e of the sheet between the frame member 26 and the vicinity of the outer peripheral edge 3e of the window plate. Reference numeral 512 denotes the concave for preventing the contact with the window plate 3.

The cavity mold 52 is made up of the two runner plates 52a and 52b, and the runner 58 is formed on the mating face between the runner plates 52a and 52b. This runner 58 communicates with the injection gate 590 provided on the mold face 521 of the cavity mold 52 to supply a liquid-form synthetic resin or a liquid-form resin raw material to the cavity Ca. As shown in the figure, the injection gate 590 may be formed at one location in the cavity Ca. However, it is preferable that, considering the case where a liquid-form synthetic resin which is less flowable due to high viscosity is used, a plurality of resin flow paths (59, 590) be additionally provided along the lengthwise direction of the cavity Ca. Reference numeral 522 denotes the concave for preventing the contact with the window plate 3.

In place of the resin flow path (59, 590) indicated by the solid line in the apparatus of the above embodiment, the resin supply port 583 indicated by the two-dot chain line may be formed on the mating face (division face) of the core mold 51 and the cavity mold 52. Thereby, in this apparatus, a liquid-form synthetic resin or a liquid-form resin raw material is injected and filled into the cavity Ca through the injection gate 590 communicating with the resin supply port 583, which is indicated by the two-dot chain line, formed on the mating face of the core mold 51 and the cavity mold 52. In this case, the long runner 58 is unnecessary, so that the amount of resin used can be reduced.

Next, the manufacturing method for the assembly having the frame member 26 will be described in the sequence of process with reference to FIG. 21.

First, as a first step, the window plate 3 is placed on the core mold 51, to which the gap forming mold 11 is installed, with the die being open and the positioning is performed. However, the first fixing means m is formed in advance in the vicinity of the outer peripheral edge 3e of the window plate 3 at which the frame member 26 is formed. As the first fixing means $m_1$, an adhesive layer is used. However, when the window plate 3 is made of a synthetic resin, in place of the first fixing means $m_1$ of an adhesive layer or in addition to this, mechanical means can be used in which many through holes or undercut-shape notches are formed along the frame member 26 in the vicinity of the outer peripheral edge 3e of window plate, and a liquid resin is fixed to the through holes or notches. Also, the adhesive layer, which is the first fixing means $m_1$, may be an adhesive layer activated by heat.

It is preferable that the window plate 3 be heated wholly to a temperature above normal temperature (about 60 to 130 C in the case of inorganic glass pane) in advance and the outer peripheral edge shape be thermally expanded as compared with the shape at normal temperature. Thereby, the temperature difference between the window plate 3 and the injected resin is decreased, so that the degree of thermal shock applied to the window plate 3 is decreased, which contributes to the restraint on cracks when the window plate 3 is made of glass. Besides, the window plate 3 contracts with the contraction after the formation of the frame member 26, so that the relative contraction of the frame member is less, by which the occurrence of an internal stress by which the frame member 26 tightens the window plate 3 from the outside can be reduced. Thereby, the window plate 3 can be prevented from being deformed in an undesirable direction by a compressive stress, or the frame member 26 can be prevented from being cracked by a residual tensile stress.

Also, the positioning of the window plate 3 is performed by using the positioning arm 55, for example, shown in FIG. 4. After the positioning, the window plate 3 is fixed. As the means for this, the vacuum suction cup, for example, shown in FIG. 4 is used. However, regarding this embodiment, the vacuum suction cup 54 should be provided with the concave 512 for preventing the contact with the window plate 3.

In a second step, as shown in FIG. 21, the core mold 51 and the cavity mold 52 are put together and clamped. A liquid-form synthetic resin melted by heating is injected into the cavity Ca formed by the mold face 511 of the core mold 51 and the mold face 521 of the cavity mold 52, the vicinity of the outer peripheral edge 3e of the window plate, and the gap forming mold 11 by which injection molding is performed. However, when a plurality of injection gates 590 are provided, it is preferable to inject a liquid-form resin at overlapping timing through the respective injection gate. In this case, the compressive forces in the face direction of the window plate 3 acting due to the pressure of the injected liquid-form resin can be canceled. Thereby, the positional shift in the face direction of the window plate 3 caused by the pressure of the liquid-form synthetic resin can be prevented.

The liquid-form synthetic resin of this embodiment is a thermoplastic resin which is made liquid-form by heating. Specifically, general-purpose plastics such as PVC resin, ABS resin, PP resin, and PS resin, the aforesaid engineering plastics, or the polymer alloy of these resins, and further a resin in which a reinforcing material is mixed can be used. These resins are softened and made flowable by heating and solidified by cooling. At this time, if the resin is injected from the slightly outside position from the outer peripheral edge 3e of the window plate 3, the resin does not collide directly with the face of the window plate 3 which is in a state of cantilever, so that no bending moment is produced on the window plate 3. Therefore, when the material of the window plate 3 is inorganic glass, the breakage and crack are prevented, and when the material of the window plate 3 is synthetic resin, the deformation is prevented.

In a third step, the liquid-form synthetic resin is solidified, and the assembly intermediate body in which the window plate 3 and the frame member 26 are integrated by the first fixing means $m_1$ is removed from the die.

In the fourth step, the gap forming mold 11 is taken out of the assembly intermediate body removed together with the gap forming mold 11 from the die, and the sheet 4 is set on the surface on the vehicle inside of the frame member 26. The vicinity of the opening edge 4e of the sheet is folded and enfolded in a gap formed between the frame member 26 and the vicinity of the outer peripheral edge 3e of the window plate by the removal of the gap forming mold 11. In this case, the fraying of the opening edge 4e of the sheet is prevented.

In a fifth step, the sheet 4 is laminated on and fixed integrally to the frame member 26 outside the cavity Ca by the second fixing means $m_2$. Thereby, the convertible top assembly is completed.

The resin sheet 4a of the sheet 4 is mutually soluble with the synthetic resin forming the frame member 26, so that it presses the sheet 4 on the frame member 26, and is heated from the sheet 4 side. By this conduction heat, the surface of the resin sheet is somewhat melted together with the synthetic resin forming the frame member 26. Also, by the pressure between the sheet 4 and the frame member 26, the frame member 26 and the sheet 4 are welded to each other strongly. In this case, the second fixing means $m_2$ is a welding portion between frame member 26 and the sheet 4. At this time, when soft PVC resin is used as a resin forming the frame member 26, the temperature of the heated synthetic resin should preferably be about 200 to 220 C.

However, even in the case where the resin sheet 4a is mutually soluble with the synthetic resin for the frame member 26, if the fixing force is insufficient in fixing between the frame member 26 and the sheet 4, it is preferable that an adhesive layer be also used. In particular, if the adhesive is an adhesive activated by heat, the adhesive layer between the frame member 26 and the sheet 4 is activated by the heating operation due to the liquid-form synthetic resin, so that the frame member 26 and the sheet 4 can be fixed to each other strongly.

At least two liquid-form resin raw materials forming a synthetic resin by reaction may be supplied to the cavity Ca. As such liquid-form resin raw materials, for example, a mixture of polyol and isocyanate, which forms polyurethane by chemical reaction, can be used. In this case, the second fixing means $m_2$ is an adhesive layer formed on the sheet 4 or a thermally activated adhesive layer.

At this time, the a separation line is formed on the sheet 4 along the inner peripheral edge of the frame member 26 while remaining an enfolding allowance, and an excess sheet may be removed. Further, as the resin sheet 4a, a water-proof resin sheet or film which prevents the entrance of rainwater is used. For stabilizing the molding of frame member 26 and from the viewpoint of style, the resin sheet whose surface is embossed finely in large number is preferable. Specifically, a soft PVC resin sheet is preferable.

The above is a description of the apparatus and method for manufacturing the assembly of the seventh embodiment. The manufacturing apparatus for an assembly entailing the formation of a frame member 27 is the same as that shown in FIG. 21 except that the shapes of the mold half and cavity are different. The manufacturing method is also the same as that used on the apparatus shown in FIG. 21.

Figure 22:
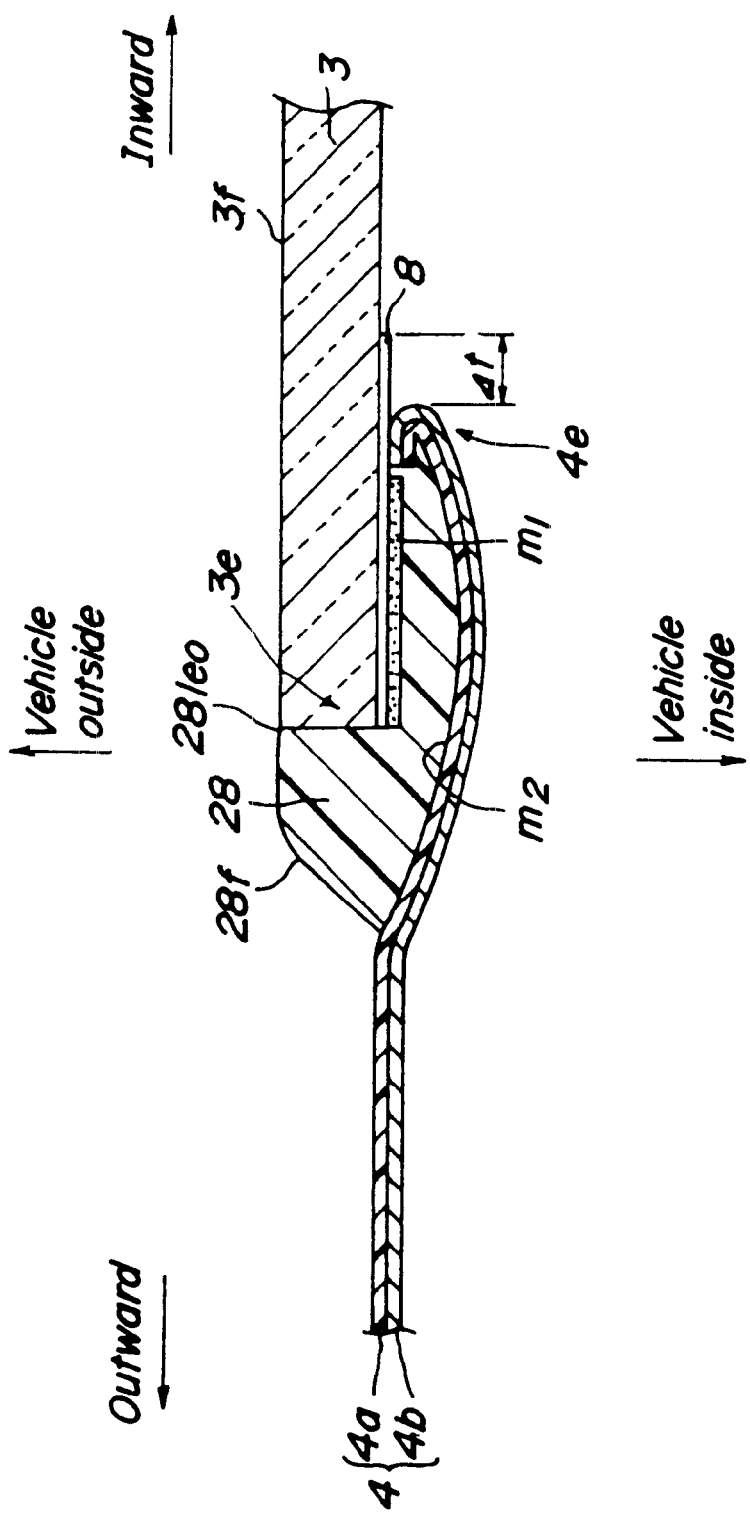
FIG. 22 is a sectional view taken along the line A—A of FIG. 2, showing the assembly of a ninth embodiment.

FIG. 22 shows an assembly of a ninth embodiment, in which the vicinity of the outer peripheral edge 3e of the window plate is fixed to a frame member 28, which is integral with the sheet 4, outside the cavity by the first fixing means $m_1$. This cross-sectional shape shows the portion corresponding to A—A cross section in FIG. 2, and the same reference numerals are applied to the same elements as those in the above description. The hot wire print 9 and terminal 10 are omitted for explanation, but, needless to say, these elements may be provided.

The frame member 28 is formed of a synthetic resin, which is filled into the cavity of die in a state of being compressed and then solidified. Also, the frame member 26 is fixed to the vicinity of the opening edge 4e of the sheet via the second fixing means $m_2$ in the cavity, and fixed to the vicinity of the outer peripheral edge 3e of the window plate via the first fixing means $m_1$ outside the cavity over the contact portion with the frame member 28. The frame member 28 is covered by the sheet 4 so as to be invisible from the vehicle inside.

The frame member 28 does not cover the surface of the window plate 3 on the vehicle outside, and an inner peripheral edge 281eo on the vehicle outside of the frame member 28 substantially agrees with the outer peripheral edge 3e of the window plate 3 and has a flat surface shape continuing smoothly with the surface portion on the vehicle outside of the window plate 3. In this case, a surface 28f on the vehicle outside of the frame member 28 and the surface 3f on the vehicle outside of the window plate are flush with each other.

Figure 23:
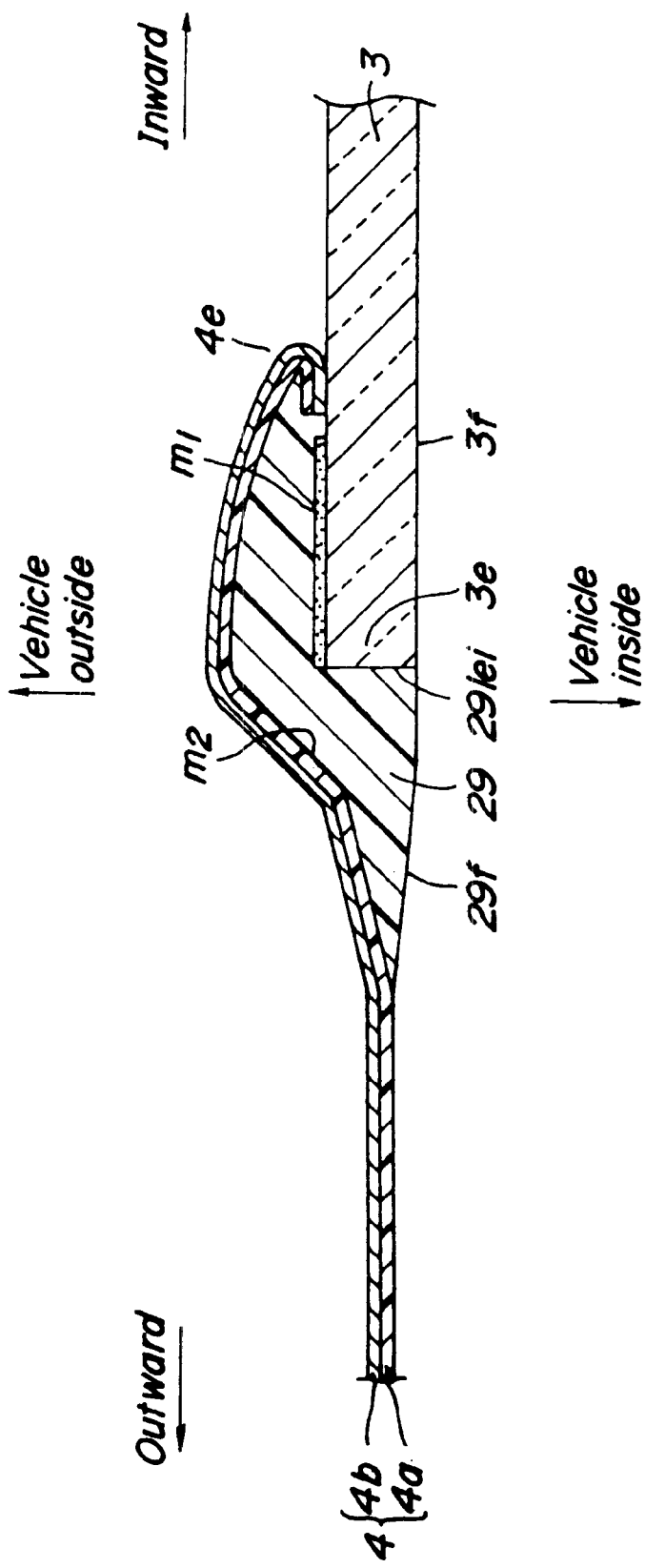
FIG. 23 is a sectional view taken along the line A—A of FIG. 2, showing the assembly of a tenth embodiment.

FIG. 23 shows an assembly of an tenth embodiment, which is the same as the assembly of the ninth embodiment except that a frame member 29 is covered by the sheet 4 so as to be invisible from the vehicle outside. This cross-sectional shape shows the portion corresponding to A—A cross section in FIG. 2, and the same reference numerals are applied to the same elements as those shown in FIG. 22. The hot wire print 9 and terminal 10 are omitted for explanation, but, needless to say, these elements may be provided.

The frame member 29 is formed of a synthetic resin, which is filled into the cavity of die in a state of being compressed and then solidified. Also, the frame member 29 is fixed to the vicinity of the opening edge 4e of the sheet via the second fixing means $m_2$ in the cavity, and fixed to the vicinity of the outer peripheral edge 3e of the window plate via the first fixing means m outside the cavity over the contact portion with the frame member 29. The frame member 29 is covered by the sheet 4 so as to be invisible from the vehicle outside.

The frame member 29 does not cover the surface of the window plate 3 on the vehicle inside, and an inner peripheral edge 291ei on the vehicle inside of the frame member 29 substantially agrees with the outer peripheral edge 3e of the window plate 3 and has a flat surface shape continuing smoothly with the surface portion on the vehicle inside of the window plate 3. In this case, a surface 29f on the vehicle inside of the frame member 29 and the surface 3f on the vehicle inside of the window plate are flush with each other.

The assembly shown in FIGS. 22 and 23 is configured so that the frame member 28 (29) is fixed to the vicinity of the outer peripheral edge 3e of the window plate 3 outside the cavity via the first fixing means $m_1$. Therefore, the fixing force between the sheet 4 and the frame member 28 (29) can be increased, and the sealing property between the sheet 4 and the frame member 28 (29) is enhanced. Moreover, since the frame member 28 (29) is filled into the cavity in a state of being compressed, it can be fixed to the sheet 4 with a sufficient strength even when the frame member 28 (29) has a deformed cross section of a complicated shape. In addition, since the frame member 28 (29) is a solidified synthetic resin, the formation range of the second fixing means $m_2$ can be selected considering the tensile force applied to the frame member 28 (29). Further, this assembly is effective even when the window plate 3 is difficult to form integrally with a synthetic resin.

The ninth and tenth embodiments are suitable for a case where the window plate 3 has a relatively complicated curved shape or a case where the thickness of the window plate 3 is relatively thin. That is, in the former case, the shape and dimensions vary more greatly than the case where the window plate 3 is flat, so that the breakage of the window plate 3 is prone to occur when the frame member is formed at the peripheral edge of the window plate 2 by injection molding. In the latter case, the window plate 3 is sometimes deformed by the application of a tightening force of the frame member. Contrarily, in the ninth and tenth embodiments, the occurrence of these problems can be avoided.

For the sheet of the ninth and tenth embodiments, like the assembly of the first to fourth embodiments, the water-proof resin sheet or film resin sheet 4a or the woven cloth 4b such as canvas, which is waterproofed and has a high tensile strength, can be used independently, but the sheet 4 of this embodiment is a sheet in which the resin sheet 4a and the woven cloth 4b are laminated. For the sheet, like the assembly of the fifth and sixth embodiment, the sheet 42 in which the resin sheet 4a is laminated on both surfaces of the woven cloth 4b may be used. However, regarding the material of the resin sheet 4a, a material which is mutually soluble with the frame member 28 (29) is preferable. If such a resin sheet is used, the second fixing means $m_2$ for fixing the frame member to the sheet is a welding portion between the frame member and the resin sheet. Even if the resin sheet and the woven cloth are not mutually soluble with the frame member 28 (29), an adhesive layer may be formed in advance as the second fixing means $m_2$ at the contacting portion with the frame member 28 (29).

Also, it is preferable that the sheet and the frame member be of the same or similar color. In this case, even if some resin leakage, burrs, etc. occur on the sheet, these defects are not conspicuous. Specifically, black containing carbon or black system color is especially preferable from the viewpoint of quality such as weather resistance.

Figure 24:
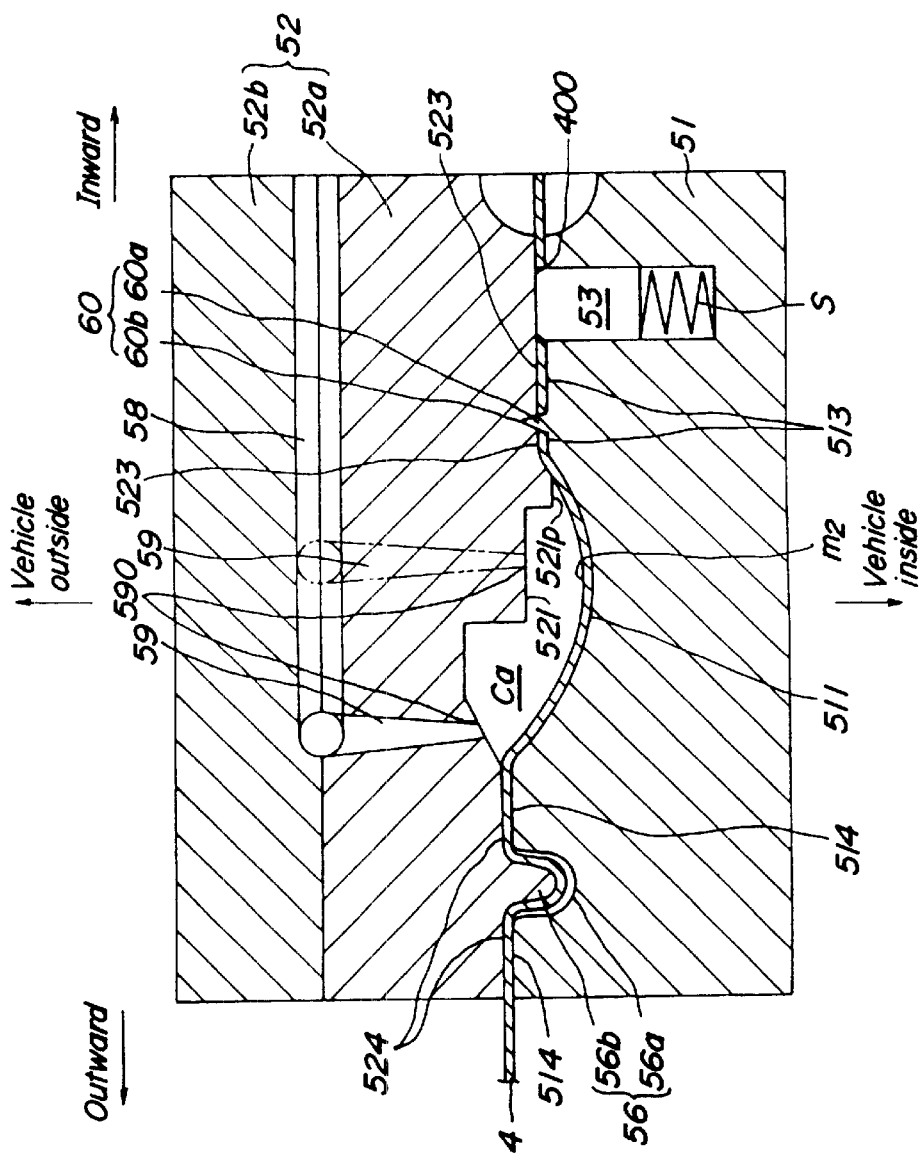
FIG. 24 is a sectional view showing a state in which a core mold and a cavity mold are closed in one embodiment of an apparatus for forming the assembly of the ninth embodiment.
Figure 25:
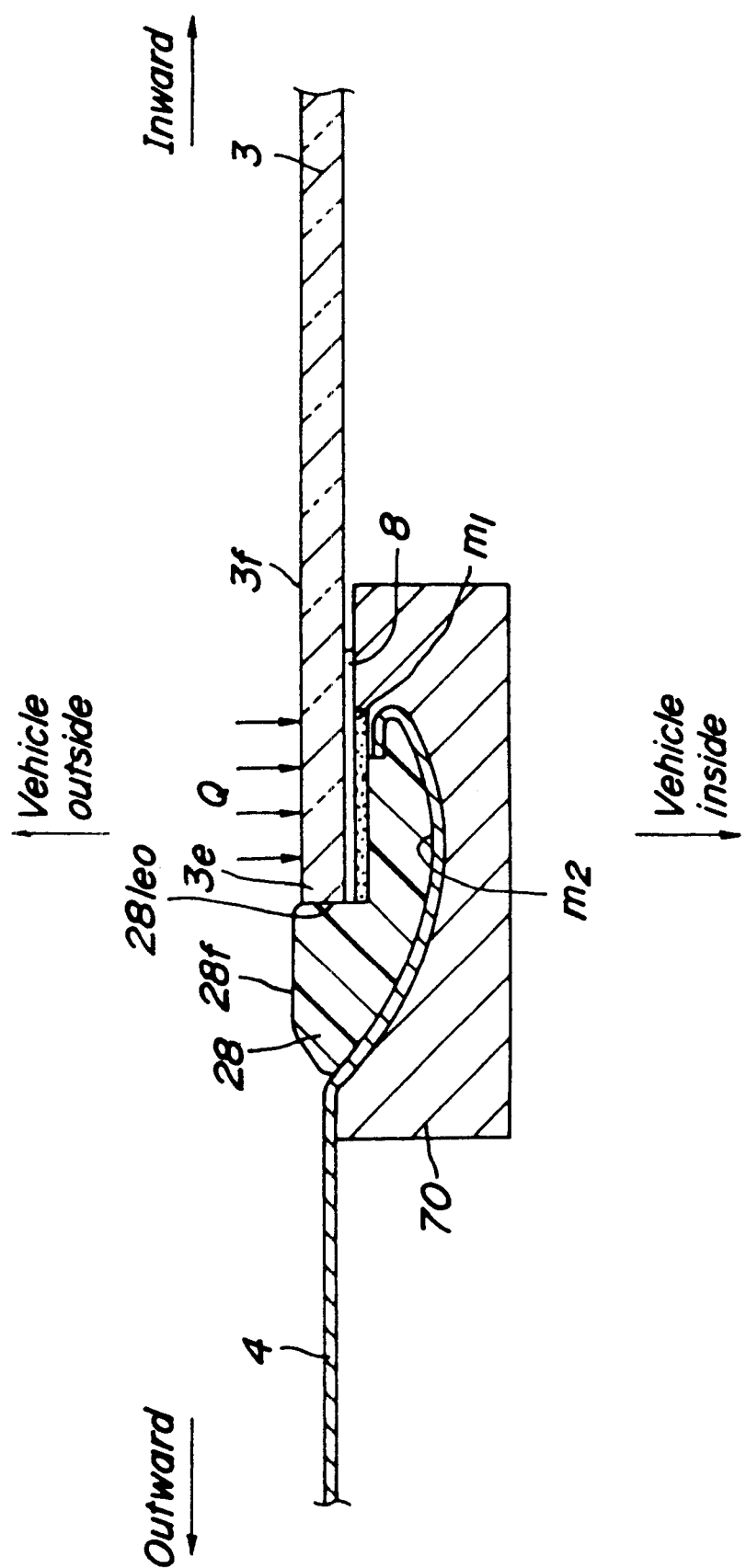
FIG. 25 is a view for illustrating a process in which a sheet material is trimmed to complete the assembly of the ninth embodiment.

FIGS. 24 and 25 show one embodiment of an apparatus for manufacturing the assembly shown in FIG. 22. FIG. 24 is a sectional view showing a forming portion of an injection die, and FIG. 25 is a sectional view showing an apparatus for fixing the frame member 28 to the vicinity of the outer peripheral edge 3e of the window plate by the first fixing means $m_1$. In FIGS. 24 and 25, the same reference numerals are applied to the same elements as those shown in FIG. 22.

In the apparatus shown in FIG. 24, when the die is closed, the cavity Ca of a predetermined shape extending in the lengthwise direction along the outer peripheral edge 3e of the window plate is formed on the division face in the die by the mold face 521 of the cavity mold 52 and the sheet 4 in close contact with the mold face 511 of the core mold 51. That is, the cavity Ca is formed by holding the sheet 4 by the holding portions 514 and 524 of the core mold 51 and the cavity mold 52 which are adjacent to the outer peripheral edge of the cavity Ca, and by sealing the division face in the die with the sheet 4 being compressed.

The core mold 51 is configured singly, and provided with the pin 53 for positioning the sheet 4 at a predetermined position with respect to the mold face 511 of the core mold 51. This positioning pin 53 is urged to the window plate 3 side by the compression spring S etc. The tip end of the pin usually protrudes from the division face of the core mold 51. The pin 53 is inserted in the positioning hole 400 formed in advance in the sheet 4, so that the sheet 4 is fixed to a predetermined position.

The cavity mold 52 is made up of the two runner plates 52a and 52b, and the runner 58 is formed on the mating face between the runner plates 52a and 52b. This runner 58 communicates with the injection gate 590 provided on the mold face 521 of the cavity mold 52 to supply a liquid-form synthetic resin or a liquid-form resin raw material to the cavity Ca. The injection gate 590 may be formed at one location indicated by the solid line. However, it is preferable that, considering the case where a liquid-form synthetic resin which is less flowable due to high viscosity is used, a plurality of resin flow paths (59, 590) be additionally provided along the lengthwise direction of the cavity Ca. If the injection gate 590 is provided at a position where the window plate 3 is stored as indicated by the two-dot chain line, the trace of gate produced by the forming can be made invisible from the outside.

Also, the mold face 521 of the cavity mold 52 is provided with a convex step portion 521p as gap forming means. This convex step portion 521p forms a gap for enfolding the opening edge 4e of sheet between the frame member 28 and the vicinity of the outer peripheral edge 3e on the vehicle outside surface or the vehicle inside surface of the window plate 3.

The pulling means 56 is provided at the holding portion 514 of the core mold 51 and the holding portion 524 of the cavity mold 52 as in the cases shown in FIGS. 14 and 15. The pulling means 56 is made up of the annular concave portion 56a and convex portion 56b along the outer peripheral edge shape of the window plate 3. By the pulling means of such construction, at the same time when the core mold 51 and the cavity mold 52 are clamped, the looseness produced when the sheet 4 is positioned can be removed.

Also, the holding portions 513 and 523 of the core mold 51 and cavity mold 52 are provided with the removal means 60 made up of an annular cutter 60a along the outer peripheral shape of the window plate 3 and a cutter receiving portion 60b for receiving the cutter 60a. According to the removal means of such a construction, when the core mold 51 and the cavity mold 52 are clamped, the work for removing a sheet material which is unnecessary for the assembly is not needed, and if needed, the work can be performed easily and exactly.

FIG. 25 shows an apparatus for fixing the window plate 3 to the frame member 28 integrated with the sheet 4 by the first fixing means $m_1$. In this figure, reference numeral 70 denotes a support for the frame member 28 integrated with the sheet 4. This support 70 has a pressurizer (not shown) for holding the window plate 3 and the frame member 28 and heating means (not shown) for heating the first fixing means ml. As this heating means, for example, an infrared ray irradiating device for irradiating infrared rays to the target is used. If the first fixing means $m_1$ is an adhesive which is hardened by ultraviolet rays, a ultraviolet ray irradiating device may be used in place of the infrared ray irradiating device.

Next, the manufacturing method for the assembly having the frame member 28 will be described in the sequence of process.

First, as a first step, the sheet 4 is placed on the core mold 51 with the die being open and the positioning is performed. Specifically, the positioning is performed by aligning the positioning hole 400 formed in advance in the sheet 4 with the positioning pin 53 as shown in FIG. 24. If an embossing pattern with many minute irregularities is formed on the surface of the resin sheet 4a of the sheet 42, at holding portions 513 and 523 and the on the inner periphery side and holding portions 514 and 524 on the outer peripheral side, the sheet 4 is compressed slightly and acts as a seal material which allows a gas to pass through but prevents a liquid from passing through. Therefore, the liquid-form synthetic resin injected and filled into the cavity Ca is prevented from leaking from between the core mold 51 and the cavity mold 52, and also the air in the cavity Ca is discharged effectively. As the resin sheet, for example, a soft PVC resin sheet can be used.

In a second step, as shown in FIG. 24, the core mold 51 and the cavity mold 52 are put together and clamped. At this time, the sheet 4 is in contact with the mold face 511 of the core mold 51, and the cavity Ca is formed by the mold face 521 of the cavity mold 52 and the sheet 4 in contact with the mold face 511 of the core mold 51. Simultaneously with the mold clamping, the sheet 4 is pulled to four directions by the pulling means 56, by which the looseness of sheet is removed, and the opening edge 4e of the same or similar shape as or to the outer peripheral shape of the window plate is formed by the removal means 60.

In a third step, a liquid-form synthetic resin which is melted by heating is injected from the injection gate 590 of the cavity mold 52 into the cavity Ca. The liquid-form synthetic resin of this embodiment is a thermoplastic resin which is made liquid-form by heating. Specifically, general-purpose plastics such as PVC resin, ABS resin, PP resin, and PS resin, engineering plastics, or the polymer alloy of these resins, and further a resin in which a reinforcing material is mixed can be used. These resins are softened and made flowable by heating and solidified by cooling.

Since the resin sheet 4a of the sheet 4 is mutually soluble with the synthetic resin forming the frame member 28, the surface of the resin sheet 4a is somewhat melted by the conduction heat of the injected liquid-form synthetic resin, melts together with the synthetic resin forming the frame member 28, and provides strong welding by the pressure of the injected liquid-form synthetic resin. In this case, the second fixing means $m_2$ is the welding portion of the frame member 28 and the resin sheet 4a. At this time, when a soft PVC resin is used as a resin forming the frame member 28, it is preferable that the injected liquid-form synthetic resin be heated to a temperature of about 200 to 220 C and melted. Also, as the resin sheet 4a, a water-proof resin sheet or film which prevents the entrance of rainwater is used. For stabilizing the molding of frame member 28 and from the viewpoint of style, the resin sheet whose surface is embossed finely in large number is preferable. Specifically, a soft PVC resin sheet is preferable.

However, even in the case where the resin sheet 4a is mutually soluble with the synthetic resin for the frame member 28, if the fixing force is insufficient in fixing between the frame member 28 and the sheet 4, it is preferable that an adhesive layer be also used. In particular, if the adhesive is an adhesive activated by heat, the adhesive layer between the frame member 28 and the sheet 4 is activated by the heating operation due to the liquid-form synthetic resin, so that the frame member 28 and the sheet 4 can be fixed to each other strongly.

At least two liquid-form resin raw materials forming a synthetic resin by reaction may be injected into the cavity Ca. As such liquid-form resin raw materials, for example, a mixture of polyol and isocyanate, which forms polyurethane by chemical reaction, can be used. In this case, the second fixing means $m_2$ is an adhesive layer formed on the sheet 4 or a thermally activated adhesive layer.

The colors of the sheet 4 and the frame member 28 are preferably the same or of the same system for the purpose such that even if some resin leakage, burrs, etc. occur on the sheet 4, these defects are not conspicuous. Specifically, black containing carbon or black system color is especially preferable from the viewpoint of quality such as weather resistance.

In a fourth step, the liquid-form synthetic resin is solidified, and the assembly intermediate body in which the sheet 4 and the frame member 28 are integrated by the second fixing means $m_2$ is removed from the die.

In a fifth step, as shown in FIG. 25, the assembly intermediate body removed from the die is positioned on the support 70. At this time, the vicinity of the opening edge 4e of sheet is folded and enfolded in a gap formed between the frame member 28 and the vicinity of the outer peripheral edge 3e of window plate by the convex step portion 521p provided on the mold face 521. The enfolding prevents the opening edge 4e of sheet from separating from the frame member 28. Subsequently, the vicinity of the outer peripheral edge 3e of window plate is arranged at the storage portion formed on the frame member 28, by which the frame member 28 is fixed to the window plate 3 by the first fixing means m. However, the first fixing means $m_1$ is formed in advance in the vicinity of the outer peripheral edge 3e of the window plate 3. As the specific first fixing means $m_1$, an adhesive layer is used, but an adhesive layer activated by heat may be used.

When the first fixing means $m_1$ is a heat activated adhesive such as acrylic modified phenolic resin adhesive or hot melt adhesive as described above, the window plate 3 is pressed in the direction of the frame member 28 as a sixth step, and infrared rays are irradiated from above the support. The irradiated infrared rays Q pass through the window plate and heat and activate the first fixing means $m_1$, so that the window plate 3 and the frame member 28 are fixed to each other by bonding. If the first fixing means $m_1$ is an adhesive which is hardened by ultraviolet rays, ultraviolet rays may be irradiated by using the aforesaid ultraviolet ray irradiating device in place of the irradiation of infrared rays. Thereby, the convertible top assembly is completed.

The above is a description of the apparatus and method for manufacturing the assembly of the ninth embodiment. The manufacturing apparatus for an assembly entailing the formation of a frame member 29 is the same as that shown in FIGS. 24 and 25 except that the shapes of the mold half and cavity are different. The manufacturing method is also the same as that used on the apparatus shown in FIGS. 24 and 25.

The above is a description of the embodiments of the convertible top assembly and the manufacturing method and apparatus for the same in accordance with the present invention.

Although the sheet 4 is trimmed after the frame member 2, 21 to 29 is formed in all of the above-described embodiments regarding the manufacturing method for the assembly, the present invention is not limited to this. The opening edge 4e (42e) of the sheet 4 (42) may be formed by being trimmed in advance along the intended portion of the opening edge 4e (42e). Alternatively, perforations capable of being torn afterward may be formed along the intended portion of the opening edge 4e (42e). Thereby, in the former method, the subsequent trimming process is not needed, and in the latter method, the subsequent trimming process is simplified.

Although regarding the forming method for the frame member 2, 21 to 29, the general injection molding method and reaction injection molding (RIM) method are used in the above embodiments, the present invention is not limited to these methods. A casting method can be used in which a sol-form liquid resin is poured into the cavity Ca and energy such as heat is applied to this resin to solidify it. Alternatively, a heated foam molding method can be used in which an intermediate body consisting of a foaming unfinished thermoplastic synthetic resin for forming a frame member is placed in the cavity Ca in the die, the aforesaid resin is softened by applying heat in a state in which the mold is clamped, and the apparent volume of the resin is increased by foam expanding a foaming agent to fill the cavity Ca with resin.

As is apparent from the above description, according to the present invention, there can be provided a convertible top assembly in which the sheet and frame member are formed with a sufficient fixing strength and the performance is not affected by the cross-sectional shape of frame member, and a manufacturing method and apparatus capable of manufacturing the assembly easily.

What is claimed is:

1. A manufacturing method for a convertible top assembly, said convertible top assembly including, a window plate made of a transparent material, said window plate having top and back surfaces and a predetermined outer peripheral edge shape;

a foldable sheet material having an opening edge and an outer peripheral edge shape larger than the outer peripheral edge shape of said window plate and made of a material softer than said window plate;

a connecting element to integrate said window plate and said sheet material, said connecting element being made of a synthetic resin formed in an elongated form along the outer peripheral edge of said window plate with a predetermined cross-sectional profile between the vicinity of said outer peripheral edge of said window plate and the vicinity of the opening edge of said sheet material;

first fixing means for fixing the vicinity of outer peripheral edge of said window plate and said connecting element to each other; and second fixing means for fixing the vicinity of said opening edge of said sheet material and said connecting element to each other, said method of manufacturing comprising the steps of:

positioning at least a portion of said window plate and said sheet material at a predetermined position between a pair of mold halves of a mold which can be separated from each other at a parting face, clamping said mold to form a cavity of a predetermined shape extending in the lengthwise direction along the outer peripheral edge of said window plate in the vicinity of the outer peripheral edge of said window plate, a part of said cavity being formed by said window plate, whereby said window plate is held through said sheet material by holding portions of the mold adjacent to the inner peripheral edge of said cavity, and said sheet material is held by holding portions of the mold adjacent to the outer peripheral edge of said cavity, and filling said cavity with a liquid-form synthetic resin or a liquid-form resin raw material that forms a synthetic resin by reaction, the interior of said cavity being kept in a heated and compressed state, said connecting element being formed into a shape corresponding to the shape of said cavity by subsequent solidification, said connecting element being fixed integrally to the vicinity of the outer peripheral edge of said window plate by said first fixing means, and said sheet material being fixed integrally to said connecting element by said second fixing means.

2. A manufacturing method according to claim 1, wherein said sheet material is brought into close contact with the mold face of one of said mold halves so as to form a part of said cavity.

3. A manufacturing method according to claim 2, wherein said liquid-form synthetic resin or liquid-form resin raw material is injected and filled into said cavity from at least one injection gate provided in said mold half on the side on which said sheet material is not in close contact.

4. A manufacturing method according to claims 1, wherein said sheet material is separated from both mold faces so that said cavity formed by the mold faces of said mold halves and said window plate is divided along the extending direction of said window plate.

5. A manufacturing method according to claim 4, wherein a hole is formed in the vicinity of the opening edge of said sheet material, a part of said connecting element is formed in said hole, and third fixing means is provided for fixing said connecting element and said sheet material to each other.

6. A manufacturing method according to claim 4 or 5, wherein a hole is formed in the vicinity of outer peripheral edge of said window plate, a part of said connecting element is formed in said hole, and fourth fixing means is provided for fixing said connecting element and said window plate to each other.

7. A manufacturing method according to claim 4, wherein fifth fixing means is provided to fix said first fixing means and said second fixing means to each other.

8. A manufacturing method according to claim 4, wherein said liquid-form synthetic resin or a liquid-form resin raw material is injected into said cavity from at least one injection gate provided in each of said paired mold halves.

9. A manufacturing method according to claim 1, wherein said sheet material is fixed to and laminated integrally to said connecting element outside said cavity by said second fixing means.

10. A manufacturing method according to claim 1, wherein said sheet material is disposed at a predetermined position between said mold halves and fixed integrally to said connecting element outside said cavity by said second fixing means.

11. A manufacturing method according to claim 10, wherein said sheet material is cut so as to form an opening edge of a substantially same or similar shape to the outer peripheral edge shape of said window plate during said mold clamping step.

12. A manufacturing method according to claim 10 or 11, wherein said liquid-form synthetic resin or liquid-form resin raw material is injected and filled into said cavity from at least one injection gate provided in said mold half.

13. A manufacturing method according to claims 9, 10 or 11, wherein a step portion for enfolding the vicinity of the opening edge of said sheet material is formed at a position adjacent to the vicinity of the outer peripheral edge of the surface of the vehicle outside or vehicle inside of said window plate of said connecting element.

14. A manufacturing method according to claim 3 or 8, wherein a plurality of injection gates are provided along the lengthwise direction of said cavity, and a liquid-form synthetic resin or a liquid-form resin raw material is injected from each of said injection gates.

15. A manufacturing method according to claim 14, wherein said plurality of injection gates are provided at positions corresponding to at least a pair of opposed portions in the vicinity of the outer peripheral edge of said window plate, said liquid-form synthetic resin or liquid-form resin raw material being injected from each of said injection gates at overlapping timing, and compressive forces in the face direction being applied to said window plate by the injected liquid-form synthetic resin and liquid-form resin raw material are balanced with each other.

16. A manufacturing method according to claim 1, wherein the opening edge of said sheet material is made of a predetermined shape that matches the outer peripheral shape of said window plate.

17. A manufacturing method according to claim 1, wherein a separation line is formed along the inner peripheral edge of said connecting element to permit removal of a portion of said sheet material at a portion which is not fixed to said connecting element.

18. A manufacturing method according to claim 1, wherein an embossing pattern bearing minute irregularities is formed on the surface of said sheet material, and said sheet material is arranged in a direction such that said surface with irregularities is opposed to the face of said window plate.

19. A manufacturing method according to claim 1, wherein said injected liquid-form synthetic resin is a heated and melted liquid-form thermoplastic resin.

20. A manufacturing method according to claim 19, wherein said window plate is heated to a temperature that causes expansion, and subsequently cooled while in contact with said connecting element.

21. A manufacturing method according to claim 1, wherein said injected liquid-form resin raw material includes a mixed liquid of polyol and isocyanate.

22. A manufacturing method according to claim 1, wherein said filled synthetic resin is of similar color as the color of said sheet material.

23. A manufacturing method according to claim 12, wherein a step portion for enfolding the vicinity of the opening edge of said sheet material is formed at a position adjacent to the vicinity of the outer peripheral edge of the surface of the vehicle a outside or vehicle inside of said window plate of said connecting element.

24. A manufacturing method according to claim 12, wherein a plurality of injection gates are provided along the lengthwise direction of said cavity, and a liquid-form synthetic resin or a liquid-form resin raw material is injected from each of said injection gates.

* * * * *

UNITED STATES PATENT AND TRADEMARK OFFICE
CERTIFICATE OF CORRECTION

PATENT NO. : 6,620,365 B1
DATED : September 16, 2003
INVENTOR(S) : Kozo Odoi et al.

It is certified that error appears in the above-identified patent and that said Letters Patent is hereby corrected as shown below:

Column 38,
Line 13, delete "claims", and insert -- claim --.

Column 40,
Line 16, delete "a".

Signed and Sealed this

Thirteenth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,620,365 B1
DATED : September 16, 2003
INVENTOR(S) : Kozo Odoi et al.

It is certified that error appears in the above-identified patent and that said Letters Patent is hereby corrected as shown below:

Title page,
Item [73], Assignee, after "Mazda Motor Corporation, Hiroshima (JP)" insert -- ; Hashimoto Forming Industry Co., Ltd., Yokohama (JP) --.

Signed and Sealed this

Seventh Day of February, 2006

JON W. DUDAS
*Director of the United States Patent and Trademark Office*